United States Patent
Pedersen et al.

(10) Patent No.: US 10,152,514 B2
(45) Date of Patent: *Dec. 11, 2018

(54) SYSTEM FOR COMPUTERIZED EVALUATION OF PATENT-RELATED INFORMATION

(71) Applicant: Patterson Thuente Pedersen, P.A., Minneapolis, MN (US)

(72) Inventors: Brad Pedersen, Minneapolis, MN (US); Christian Girtz, Minneapolis, MN (US)

(73) Assignee: Patterson Thuente Pedersen, P.A., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,265

(22) Filed: Aug. 16, 2016

(65) Prior Publication Data

US 2017/0046393 A1 Feb. 16, 2017

Related U.S. Application Data

(63) Continuation of application No. 13/783,920, filed on Mar. 4, 2013, now Pat. No. 9,418,083.

(60) Provisional application No. 61/636,249, filed on Apr. 20, 2012.

(51) Int. Cl.
| | | |
|---|---|---|
| G06F 7/00 | (2006.01) | |
| G06F 17/00 | (2006.01) | |
| G06F 17/30 | (2006.01) | |
| G06Q 50/18 | (2012.01) | |

(52) U.S. Cl.
CPC .... *G06F 17/30489* (2013.01); *G06F 17/3053* (2013.01); *G06F 17/30289* (2013.01); *G06F 17/30327* (2013.01); *G06F 17/30643* (2013.01); *G06F 17/30651* (2013.01); *G06Q 50/184* (2013.01)

(58) Field of Classification Search
None
See application file for complete search history.

(56) References Cited

U.S. PATENT DOCUMENTS

| | | |
|---|---|---|
| 7,536,331 B1 | 5/2009 | Pellegrino et al. |
| 7,590,310 B2 | 9/2009 | Retterath et al. |
| (Continued) | | |

OTHER PUBLICATIONS

Application and File history for U.S. Appl. No. 13/783,920, filed Mar. 4, 2013, now U.S. Pat. No. 9,418,083, Inventors: Pedersen et al.

*Primary Examiner* — Susan Chen
(74) *Attorney, Agent, or Firm* — Patterson Thuente Pedersen, P.A.

(57) ABSTRACT

A computerized reference analysis tool utilizes a prior art reference collection process to create a relatively smaller set of relevant references, together with a computerized reference ranking engine that ranks the set of harvested references for relevance with respect to the entirety of a claim set for a patent or patent application. The results of the computerized reference analysis tool harvesting and ranking this smaller set of prior art references can be presented to a user as an aggregated relevance listing, together with a visually or graphically displayed representation of the relevance ranking of the prior art references relative to individual claims and/or to individual claim elements.

8 Claims, 13 Drawing Sheets

(56) References Cited

U.S. PATENT DOCUMENTS

| | | | |
|---|---|---|---|
| 7,673,344 B1* | 3/2010 | Rowney | G06F 17/30516 713/189 |
| 9,418,083 B2 | 8/2016 | Pedersen et al. | |
| 2002/0105550 A1* | 8/2002 | Biebesheimer | G06F 17/30696 715/835 |
| 2005/0060287 A1* | 3/2005 | Hellman | G06F 17/30705 |
| 2005/0235252 A1* | 10/2005 | Knight | G06Q 10/00 717/104 |
| 2006/0235811 A1 | 10/2006 | Fairweather | |
| 2007/0073625 A1 | 3/2007 | Shelton | |
| 2008/0228564 A1* | 9/2008 | de Heer | G06Q 30/02 705/14.61 |
| 2009/0059378 A1* | 3/2009 | Thompson | G02B 6/0051 359/599 |
| 2009/0300700 A1 | 12/2009 | Yeh et al. | |
| 2010/0005094 A1 | 1/2010 | Poltorak | |
| 2010/0284200 A1 | 11/2010 | Lin | |
| 2011/0289040 A1 | 11/2011 | Johnson | |
| 2012/0265744 A1 | 10/2012 | Berkowitz et al. | |

* cited by examiner

1. A hat for an animal, comprising:
    a shell;
    a harness arrangement attached directly to the hat, including a first strap and a second strap, wherein the first strap and the second strap each have two loose ends which are movably secured to the shell of the hat; and
    the first strap and the second strap cross each other at a point below the muzzle of the animal when the hat is secured.

2. A hat for an animal, comprising:
    a shell;
    a harness arrangement attached directly to the hat, including a first strap and a second strap, wherein the first strap and the second strap each have two loose ends which are movably secured to the shell of the hat; and
    the first strap and the second strap cross each other at a point below the muzzle of the animal when the hat is secured;
    wherein at least one of the first strap and the second strap is of a resilient material.

3. A hat for an animal, comprising:
    a shell;
    a harness arrangement attached directly to the hat, including a first strap and a second strap, wherein the first strap and the second strap each have two loose ends which are movably secured to the shell of the hat; and
    the first strap and the second strap cross each other at a point below the muzzle of the animal when the hat is secured;
    wherein at least one of the first strap and the second strap is of a non-resilient material.

4. A hat for an animal, comprising:
    a shell;
    a harness arrangement attached directly to the hat, including a first strap and a second strap, wherein the first strap and the second strap each have two loose ends which are movably secured to the shell of the hat;
    the first strap and the second strap cross each other at a point below the muzzle of the animal when the hat is secured; and
    an outer shell in the form of one of a baseball hat, a mortarboard, a cowboy hat, a chef's hat, a tiara, a fireman's hat, a beach hat, a visor, a top hat, a sailor's hat, a touring cap, a fisherman's hat, a Santa's hat, a Robin Hood's hat, a Maid Marion's hat and a Sherlock Holmes' hat.

5. A hat for an animal, comprising:
    a shell;
    a harness arrangement attached directly to the hat, including a first strap and a second strap, wherein the first strap and the second strap each have two loose ends which are movably secured to the shell of the hat;
    the first strap and the second strap cross each other at a point below the muzzle of the animal when the hat is secured;
    stitching; and
    the loose ends of the first strap and the second strap are movably secured to the shell of the hat with the stitching.

6. A hat for an animal, comprising:
    a shell;
    a harness arrangement attached directly to the hat, including a first strap and a second strap, wherein the first strap and the second strap each have two loose ends which are movably secured to the shell of the hat;
    the first strap and the second strap cross each other at a point below the muzzle of the animal when the hat is secured;
    stitching; and
    the loose ends of the first strap and the second strap are movably secured to the shell of the hat with the stitching,
    wherein each loose end of the first strap and the second strap includes a knot to prevent each loose end from sliding out of the stitching.

FIG. 7A

| FIG. 7A Claim 1 Filtered Element Frequency and Top Words | | | |
|---|---|---|---|
| Word | Occurrences | Frequency | Rank |
| hat | 4 | 10.3% | 1 |
| first strap | 3 | 8.3% | 2 |
| second strap | 3 | 8.3% | 2 |
| animal | 2 | 5.1% | 3 |
| secured | 2 | 5.1% | 3 |
| shell | 2 | 5.1% | 3 |
| loose end | 1 | 2.6% | 4 |
| arrangement | 1 | 2.6% | 4 |
| movably | 1 | 2.6% | 4 |

FIG. 7B

| FIG. 7A Claim 5 Filtered Element Frequency and Top Words | | | |
|---|---|---|---|
| Word | Occurrences | Frequency | Rank |
| hat | 5 | 12.2% | 1 |
| first strap | 4 | 9.8% | 2 |
| second strap | 4 | 9.8% | 2 |
| shell | 3 | 7.3% | 3 |
| secured | 3 | 7.3% | 3 |
| stitching | 2 | 4.9% | 4 |
| loose end | 2 | 4.9% | 4 |
| movably | 2 | 4.9% | 4 |
| animal | 2 | 4.9% | 4 |

FIG. 7C

| FIG. 7A Claim 6 Filtered Element Frequency and Top Words | | | |
|---|---|---|---|
| Word | Occurrences | Frequency | Rank |
| hat | 5 | 9.4% | 1 |
| first strap | 5 | 9.4% | 1 |
| second strap | 5 | 9.4% | 1 |
| loose end | 4 | 7.5% | 2 |
| each | 4 | 7.5% | 2 |
| shell | 3 | 5.7% | 3 |
| secured | 3 | 5.7% | 3 |
| stitching | 3 | 5.7% | 3 |
| animal | 2 | 3.8% | 4 |

FIG. 7D

| FIG. 7A Expanded Claimset Filtered Element Frequency and Top Words | | | |
|---|---|---|---|
| Word | Occurrences | Frequency | Rank |
| hat | 28 | 11% | 1 |
| first strap | 23 | 9% | 2 |
| second strap | 23 | 9% | 2 |
| each | 14 | 5.5% | 3 |
| shell | 14 | 5.5% | 3 |
| secured | 14 | 5.5% | 3 |
| animal | 12 | 4.7% | 4 |
| loose end | 10 | 3.9% | 5 |
| movably | 8 | 3.1% | 6 |
| muzzle | 6 | 1.1% | 7 |
| harness arrangement | 6 | 1.1% | 7 |
| stitching | 4 | 0.8% | 8 |

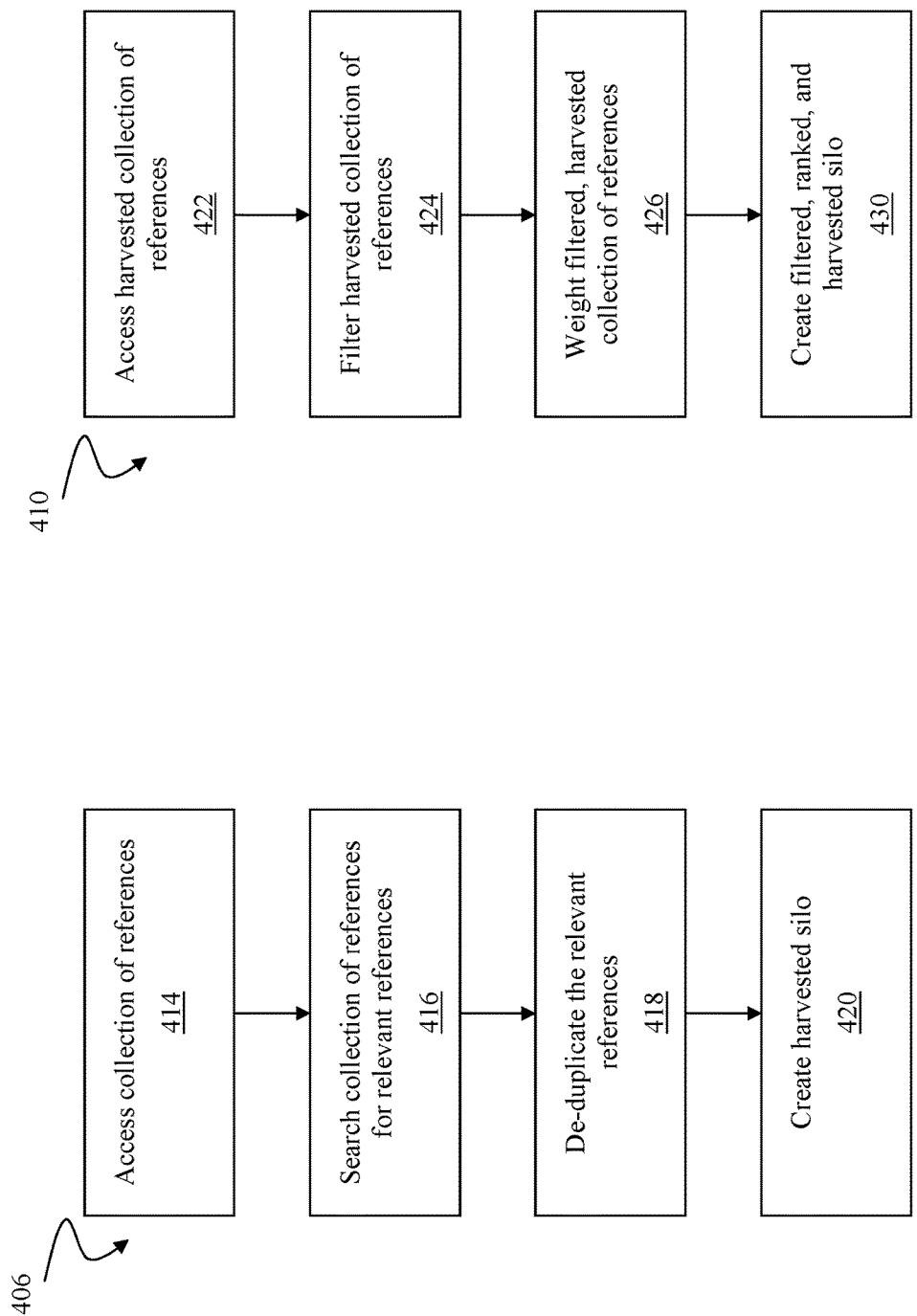

SYSTEM FOR COMPUTERIZED EVALUATION OF PATENT-RELATED INFORMATION

RELATED APPLICATION

This application is a continuation of application Ser. No. 13/783,920 filed Mar. 4, 2013, now U.S. Pat. No. 9,418,083 issued Aug. 16, 2016, which claims the benefit of U.S. Provisional Application No. 61/636,249 filed Apr. 20, 2012, which is incorporated herein in its entirety by reference.

TECHNICAL FIELD

The invention relates generally to data processing, including automated computerized business practice and management systems. More particularly, the present invention relates to a computerized system for patent-related information harvesting and evaluation.

BACKGROUND

Traditional computerized reference searching for patent-related information is typically conducted by a user manually interfacing with a database or set of databases. As such, the user or searcher typically utilizes keyword searching for targeted word or phrase results. The searcher can also include, for example, date restrictions, reference result category restrictions, or author, inventor, or owner restrictions to further limit returned results sets. In the context of patent references, prior art searching is likewise typically conducted manually using principally keyword searching and restriction by date, patent class or type, or inventor or assignee, for example.

Patent Examiners, professional patent searchers, other patent professionals, individual inventors, IP insurance underwriters, or corporate officers, for example, often utilize these manual searching techniques to conduct landscape, prior art, clearance, or any number of other reference searches. The results gathered by the searching process can provide a view into the state of the art for the keywords or phrases being searched. Relevant references can be subsequently or concurrently identified and analyzed manually by the searchers.

However, the searching process is often more art form than scientific process, and therefore depends heavily on the skills of the searcher. For example, after returning a results set based on a search string, the searcher often makes a judgment call on whether to follow a research thread belonging to a particular result. The searcher's judgment can be based on various aspects of the reference; for example, the specification, the claims, or the figures (in the patent reference context). For many references, multiple aspects of the reference need to be manually studied in order to make a judgment on the reference, and the instincts and experience of the searcher are critical in this process.

The research threads followed by searchers can include other references citing to or cited by the particular reference, and other references similarly or tangentially related. It takes little imagination to understand the various components or slight differences in what is being identified in a reference by the searcher that may factor in to a fruitful or non-fruitful search. The capabilities of one searcher are often fundamentally different than the capabilities of another searcher. Further, this method of manually filtering potential research threads is often an acquired skill that involves instinct rather than a sequential set of pre-defined steps that can be followed rotely. Searchers can learn from previous mistakes, but this is a costly proposition for searchers (and those funding the searches) trying to climb the searching learning curve.

This problem of keyword searching and judgment-based research thread analysis is further compounded by the nature of language. Reference authors may use different words or phrases for the same idea or topic than other authors use. Creativity must therefore be invoked to successfully navigate any particular field, by using synonyms, slang, or other variations of any set of search terms. Many searchers often lack this necessary skill. Again, searchers can learn from previous mistakes in language variations, but this is also costly. Because the searching process often invokes the aforementioned creative and learned skills, as well as instinct and intuition, the quality and efficiency of manual searching can vary wildly.

In addition, for searches mirroring a "tree" structure that targets, for example, a primary reference or set of primary references, a set of secondary references identified by bibliographic or citation listing from each of the primary reference(s), and a set of tertiary references identified by bibliographic or citation listing from each of the secondary reference(s), in practice, by the tertiary depth, the number of references is unmanageable to review on a manual basis. Moreover, the number of references to manage is compounded at every depth. This problem is likewise present for tree searches of generations of backward citations. For the reasons expressed above, the number of potential research threads that can be followed is essentially unlimited. Searches are often therefore bounded by budgets and not any relevant substantive criteria. Existing automated keyword searching likewise cannot explore every potential research thread. The manual gathering of references can be, at best, tedious, and is often unmanageable. It is therefore desirable to effectively automate reference searching and further, to rank the relevance of individual references within the results set.

U.S. Patent Publication No. 2011/0289040, entitled "Method for Creating Associating Index for the Analysis of Documents Classified in a Hierarchical Structure," offers one example of a method of improving the efficacy of a patent or a portfolio of patents based on utilization of a tree-like, hierarchical structure, for example, that of the International Patent Classification System (IPC). Subjective data, such as the decision to pursue litigation based on the subject matter, the decision to pursue patents within a particular field, the reference of other patents in other classifications, the dollar value played on patents of a particular subject matter, and the decision to pay maintenance fees can, for example, can be applied against the hierarchical structure. So-called unitary events, or those resulting from a human decision and comprehensible without reference to any other event, and so-called binary events, or those resulting from a human decision and comprehensible only with reference to itself and one other event therefore affect the hierarchical structure differently, and therefore the results set.

In another example, U.S. Pat. No. 7,536,331, entitled "Method for Determining the Risk Associated with Licensing or Enforcing Intellectual Property," describes interfacing with various input sources, including specifics of the intellectual property (IP) owner's task, litigation sources, PTO records, and government financial sources and evaluating the information by comparing it to preset standards. The preset standards or risk factors can be weighted or otherwise customized, with some risk factors deemed more important than others. Other risk indicia, such as the number of successful lawsuits per one hundred intellectual property holders can also be considered. Average recovery amounts and administrative cost amounts are also factored in. Ultimately, a composite score of the relative degree of strength associated with any undertaking to commercialize the IP at issue is calculated.

Relevancy analysis is prevalent in other fields. For example, in the biological and chemical fields, groups of molecules can be compared against other groups of molecules. Researchers at Washington State University have adapted Google's PageRank software that measures and prioritizes the relevance of various Web pages in a user's search to molecule analysis. Specifically, the researchers have equated the interactions between molecules to the links between Web pages. Some links between some molecules will be stronger and more likely than others. The same algorithm that is used to understand how Web pages are connected can be used to understand how molecules interact. Further, the adapted software can quickly characterize the interactions of millions of molecules and help researchers predict how various chemicals will react with one another. Eric Sorensen, *Chemist Applies Google Software to Molecules*, WSU News, Feb. 14, 2012.

Edward R. Tufte has published numerous texts on the visual display of information. For example, the texts "Envisioning Information," Graphics Press LLC (1990), "Visual Explanations," Graphics Press LLC (1997), and "The Visual Display of Quantitative Information," Graphics Press LLC (2d ed. 2001) all provide numerous examples of illustrations of data representations.

Further, various natural language processing classes, in the field of computer science, are taught at leading universities. Stanford University, for example, offers a natural language processing class that includes instruction on word and sentence tokenization, text classification and sentiment analysis, spelling correction, information extraction, parsing, meaning extraction, and question answering. The class further touches on the underlying theory from probability, statistics, and machine learning, and fundamental algorithms like n-gram language modeling, naive bayes and maxent classifiers, sequence models like Hidden Markov Models, probabilistic dependency and constituent parsing, and vector-space models of meaning.

In another example, text-mining software is known in other industries. For example, the text-mining application "I2E" provided by Linguamatics Ltd. allows for information extraction for information-rich and context-sensitive environments, like life science research and business intelligence needs. Relevant facts and relationships from large document collections are provided to users via real-time query results. Reporting of data is also provided in various structured forms. Semantic search capabilities are also provided using taxonomies, thesauri, and ontologies. (http://www.linguamatics.com/.)

However, at least two problems remain in the patent-related reference context. First, there remains the problem of how to obtain the appropriate harvested materials. Second, once the appropriate materials are harvested, there remains the problem of how to appropriately rank these materials. No technological solution currently exists to solve these problems. Therefore, there is a need for improvements in computerized systems for reference harvesting and reference ranking for patent-related references.

SUMMARY

Embodiments of this invention relate to a computerized reference harvesting tool that performs a prior art reference collection process to create a relatively smaller set of relevant references based on automatically harvested and pruned research threads, together with a computerized reference ranking engine that ranks the set of harvested references for relevance with respect to the entirety of a claim set for a patent or patent application. The results of the relevance ranking of this smaller set of prior art references can be presented to a user as an aggregated relevance listing, together with a visually or graphically displayed representation of the relevance ranking of the prior art references relative to individual claims and/or to individual claim elements.

In various embodiments, the reference harvesting tool can use one or more "seed sets" of references to create a silo that holds the set of relevant references to be used by the reference ranking engine. In some embodiments, the seed sets of references are identified by keyword and/or semantic searches and/or classification and/or index searches of very large resources, such as the Internet or reference or library databases. In other embodiments, the seed set of references can represent manually identified references provided by a user. In another embodiment, a seed set comprises a version of the patent Examiner search strategy, as published as part of the file wrapper on the USPTO's Patent Application Information Retrieval (PAIR) system. Preferably, at least one seed set of references represents patent references and another seed set of references represents non-patent references. In some embodiments, multiple seed sets are provided with different seed sets representing references that are more likely to be found together, such as patent references issued or published by different patent offices (e.g., U.S. patents and published applications vs. European patents and applications, or English language non-patent references vs. Chinese language non-patent references).

In one embodiment, the seed sets of references are used to automatically initiate and traverse a tree search process for harvesting a collection of potentially relevant references. The tree search process can be used to search a specified number of generations of forward and backward citations of the references starting from the seed set, e.g., 3 forward generations and 4 backward generations. In some embodiments, the backward citations are identified by bibliographic or citation listings from the specific seed set reference. In some embodiments, the tree search is expanded to search the forward and backward citations of each subsequent generation of all of the potentially relevant references identified in the iteration of the previous generation.

In various embodiments, when all of the branches of the tree search are explored, the complete set of potentially relevant references can be pruned by de-duplication and filtration of the priority/publication dates for the references based on comparisons to a specified critical date to remove references that are likely not to be considered prior art. This pruned and filtered set of potentially relevant references can then be used as the set of harvested references.

In various embodiments, the reference ranking engine uses the entire claim set of a given patent or patent application as the input for the relevance rankings. In one embodiment, the use of the entire claim occurs in an expanded form in which each dependent claim includes a repetition of all of the verbiage of the underlying dependent and independent claims. This process of expanding the entire claim set to repeat implicitly included language functions enhances the ability of this embodiment to create an inherent priority ranking of the terms and phrases used in the claim set based on occurrence. For example, claim elements or terms that appear in an independent claim, and which are therefore replicated in all of the corresponding dependent claims, may be automatically assigned a weighting function equal to the number of dependent claim plus one, as compared to a claim element or term which appears only once in a dependent claim being assigned a weighting function of just one.

In one embodiment, the output of the relative ranking is not a single table or list of the references. Instead, the output of the ranking represents a three-dimensional surface graph that shows on the axis the plane of the patent, and an identification of the references in the silo storing the set of harvested references. A surface plot on the three-dimensional graph can then indicate the relative reference relationship among the claims and the harvested references. In one embodiment, a user is able to selectively indicate whether to have the graphical output present only a single claim, all independent claims, or both independent and dependent claims. In another embodiment, the three-dimensional surface graph is portrayed in relationship to segregated claim elements, instead of claims, in order to show topographical high point of references that may be used for obviousness combinations.

In one embodiment, each of the claims in the target claim set are parsed to identify the claim term and/or claim element components of that claim. The selected set of harvested references can then be ranked according to their relevance with respect to each of the parsed terms and/or claim limitations of one or more claims in the claim set. In another embodiment, the set of harvested references can be ranked relative to the relative importance of the claim limitation in the entirety of the claim. In a further embodiment, the user can selectively specify combinations of claim terms and/or claim elements.

In one embodiment, a user can selectively determine a cutoff value for the relative ranking of the references to identify a subset of harvested and/or ranked references that would be included for a subset of further processing or evaluation.

In another embodiment, the statistical uniqueness of each of the identified parsed claim terms and/or claim limitations can be used to select the references that will be included in a subset of most relevant references for those selected claim terms and/or claim limitations.

In one embodiment, the relevancy ranking engine may include non-English references harvested by the reference harvest tool which are then translated in English by an automatic semantic and/or natural language processing to compare to the claim elements and/or claim terms of an English language version of the target claim set. In another embodiment, the relevancy ranking engine can conduct in the ranking of non-English references in the native language of the identified references, with the target claim set being translated into the native language, either by automated translation processes or by input from the user representing a manual translation of the target claim set, or by some combination thereof.

In still another embodiment, multiple translation passes are performed on the harvested set of references and the target claim set to perform relevancy rankings in a plurality of languages. In this embodiment, all of the references and the expanded target claim set would be translated into a selected common language and the relevancy ranking analysis performed. The process would then be repeated in a different selected language. The results of these language-specific relevancy rankings can be presented on a language-by-language basis, or can be combined for an aggregate score, or could be combined for an aggregated and weighted score where specified languages, such as the native language of the claim set are accorded higher weights in the aggregated score.

In another embodiment, operations of the relevancy ranking engine can be performed on a synonomized version of the target claim set. For example, the claim set can be parsed, with various terms replaced with one or more synonyms. Relevancy ranking analysis can then be performed on this synonomized version of the target claim set to provide even greater depth of analysis.

In another embodiment, instead of keyword or text-based searching and analysis, the reference harvesting tool can use one or more seed sets that comprise images or image search parameters. For example, a seed set can be populated by a preliminary image search. The subsequent harvesting based on the image seed set can be by image analysis on collections of very large image resources, such as the Internet or reference or library databases. U.S. Pat. No. 7,590,310, entitled "Methods and Apparatus for Automated True Object-Based Image Analysis and Retrieval," describes an automated and extensible system for the analysis and retrieval of images based on a region-of-interest (ROI) of one or more true objects depicted by an image. The ROI analysis focuses on the actual features of the depicted object instead of the features as represented by the content of an image. ROI analysis is one method of image analysis; however, other various known image analysis methods are also considered.

BRIEF DESCRIPTION OF THE DRAWINGS

The invention may be more completely understood in consideration of the following detailed description of various embodiments of the invention in connection with the accompanying drawings, in which:

FIG. 7A is an example expanded claimset that can be input to a ranking engine, according to an embodiment.

FIG. 7B is a summary table of claim 1 of FIG. 7A after claim element parsing and analysis, according to an embodiment.

FIG. 7C is a summary table of claim 5 of FIG. 7A, after claim element parsing and analysis, according to an embodiment.

FIG. 7D is a summary table of claim 6 of FIG. 7A, after claim element parsing and analysis, according to an embodiment.

FIG. 11 is a flowchart of a harvesting subprocess of the harvesting and ranking process of FIG. 5, according to an embodiment.

FIG. 12 is a flowchart of a ranking subprocess of the harvesting and ranking process of FIG. 5, according to an embodiment.

Figure 1:
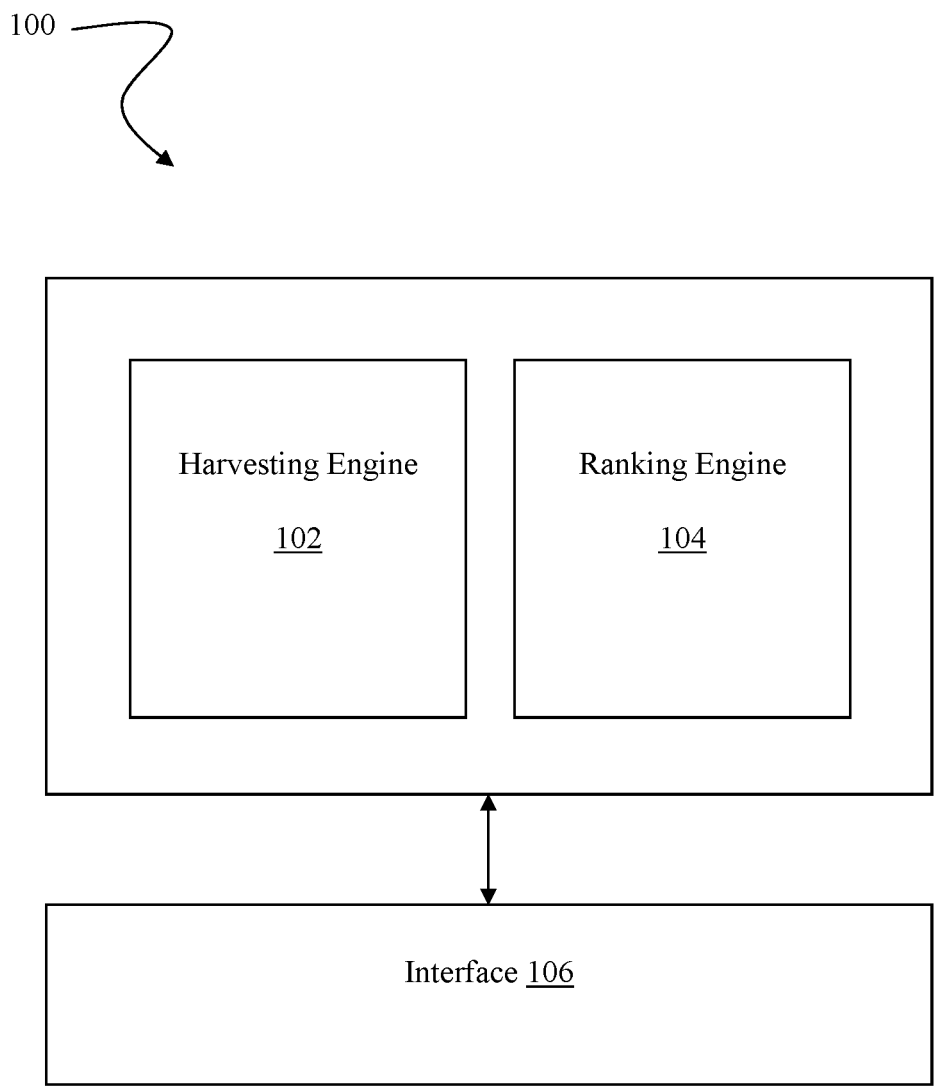
FIG. 1 is a block diagram of a computerized reference analysis system, according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Figure 2:
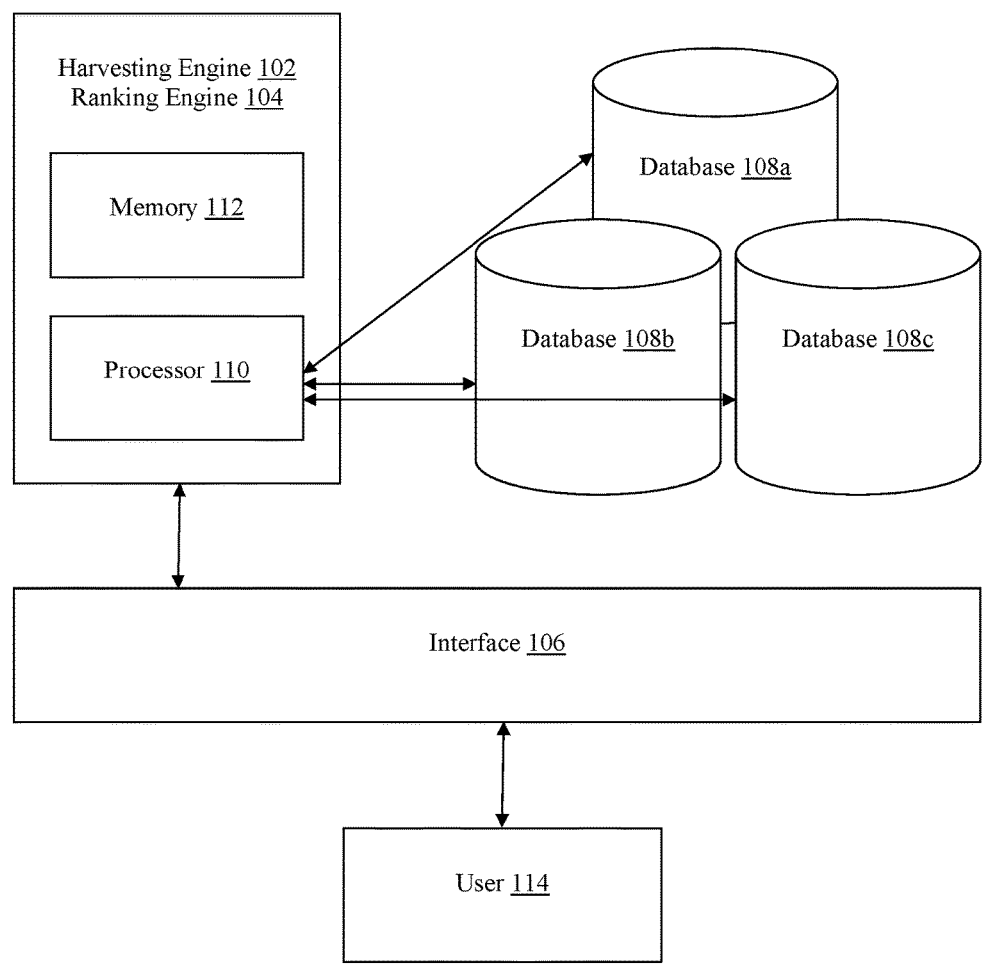
FIG. 2 is a block diagram of a computerized reference analysis system, according to an embodiment.
Figure 3:
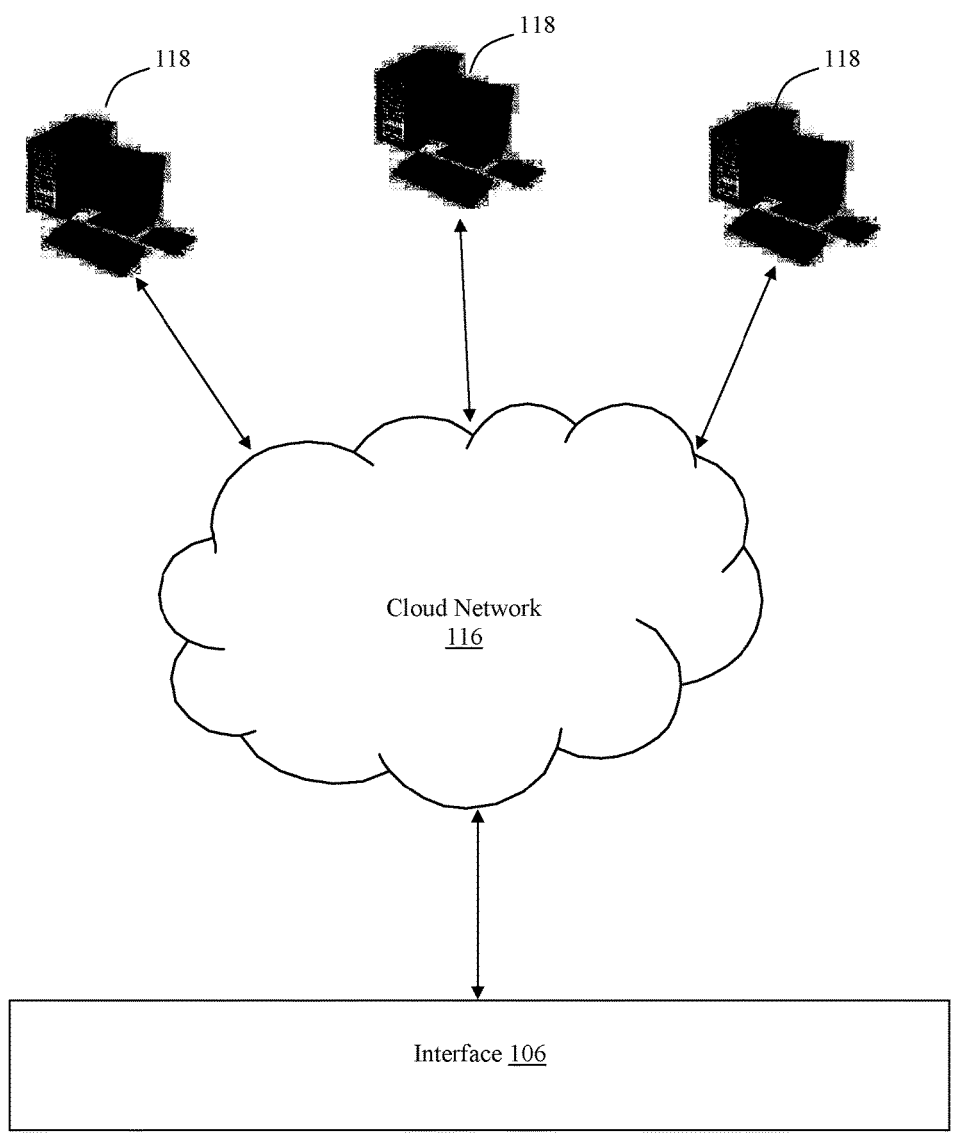
FIG. 3 is a block diagram of a computer-implemented network of a computerized reference analysis system, according to an embodiment.

Referring generally to FIGS. 1-3, a computerized reference analysis system 100 is depicted for patent-related information, according to an embodiment. For ease of discussion, in embodiments, the term "computerized reference analysis system 100" is used to define not only the harvesting functionality described herein, in embodiments, but also any ranking or relevancy functionality described herein, in other embodiments. To that end, computerized reference analysis system 100 generally comprises a harvesting engine 102, a ranking engine 104, and an interface 106. Harvesting engine 102 and ranking engine 104 can be implemented by the same physical components, in embodiments, or different physical components, in embodiments, as will be described below.

Harvesting engine 102 comprises an encapsulated process or set of processes that is adapted to receive as an input or interface with a large set of references and perform operations based on a seed set to create a relatively smaller set of relevant references. This smaller set of relevant references is called a set of "harvested references" and can be stored or otherwise captured or linked to in a "silo." Effectively, the seed set is "grown" to produce a set of relevant references that can be harvested and literally or physically stored in a silo. The "growing" process defines the searching defined by the seed set. In embodiments, search results can be identified by keyword and/or semantic searches and/or classification searches and/or index searches and/or manually identified reference capture and/or initiation and traversal of a tree search process. In embodiments, harvesting engine 102 is further configured to receive as an input or interface with a large set of references and perform operations in order to create a structured or organized database or set of references. For example, harvesting engine 102 can interface with a non-organized set of references, analyze the references or information of other references cited by the at-issue references, and create a secondary database that captures the citation relationship between references. As will be described, ranking engine 104 can then operate on this secondary database, in embodiments.

Ranking engine 104 comprises an encapsulated process or set of processes that is adapted to rank the set of harvested references for relevance as compared to a set of criteria. In an embodiment, ranking engine 104 ranks the set of harvested references for relevance with respect to the entirety of a claim set for a patent or patent application. In an embodiment, the resulting ranked silo is called a ranked patent harvest, in the context of patent references. In another embodiment, the ranked silo is called a ranked NPL harvest, in the context of non-patent literature.

Interface 106 comprises a point of interaction that is adapted to relay information to a user 114 from harvesting engine 102, ranking engine 104, or both. In an embodiment, interface 106 comprises an interactive graphical user interface (GUI). In an embodiment, interface 106 comprises a web-based user interface of a series of web pages. In an embodiment, interface 106 comprises a traditional desktop computing software GUI. In other embodiments, interface 106 can comprise command-line, touchscreen, voice, command-line, or any other desktop computing or cloud-based computing interface. In an embodiment, separate interfaces 106 to harvesting engine 102 and ranking engine 104 are provided.

Embodiments of computerized reference analysis system 100 can be performed in cloud computing, client-server, or standalone computer processing environment, or any combination thereof. The components of computerized reference analysis system 100 can be located in a singular "cloud" or network, or spread among many clouds or networks. End-user knowledge of the physical location and configuration of components of computerized reference analysis system 100 is not required.

Referring to FIG. 2, both harvesting engine 102 and ranking engine 104 are implemented within the same physical location, and within the same computing machine, according to an embodiment. As mentioned above, each of harvesting engine 102 and ranking engine 104 can comprise separate components described herein, as implemented in different computing machines. In still other embodiments, portions of the functionality described herein is implemented across two or more computing machines, the functionality of harvesting engine 102 and ranking engine 104 not being bound by any particular individual machine or individual component.

For example, referring to the cloud-implemented network of FIG. 3, an embodiment of computerized reference analysis system 100 is depicted wherein portions of harvesting engine 102 and ranking engine 104 are spread among three separate computing machines 118, each computing machine having one or more processors and computer readable medium including access to or comprising one or more databases 108.

Each computing machine 118 can include, but is not limited to, a World Wide Web server, Internet server, search engine server, vertical search engine server, social networking site server, file server, other types of electronic information server, and other types of server network devices (e.g., edge servers, firewalls, routers, gateways, etc.). Each computing machine 118 can also include, but are not limited to, network servers used for cloud computing providers, etc.

Interface 106 is in communication with a cloud communications network 116 via one or more wired and/or wireless communications interfaces such that operations of the various separate computing machines can be accessed by the user 114 via interface 106. The cloud communications network 116 can include, but is not limited to, communication over a wire connected to the networked devices, wireless communications, and other types of communications using one or more communications and/or networking protocols. The cloud communications network 116 includes one or more public cloud communications network and/or one or more private cloud communications network and/or plural combinations thereof.

The cloud communications network 116 can include, but is not limited to, a wired and/or wireless communications network comprising: the Internet, an intranet, a Local Area Network (LAN), a LAN (WiLAN), a Wide Area Network (WAN), a Metropolitan Area Network (MAN), a Public Switched Telephone Network (PSTN) and other types of wired and/or wireless communications networks. The cloud communications network 116 can also include one or more gateways, routers, bridges, switches and/or edge server network device.

Cloud communications network 116 can also include a paging and wireless messaging network, a wireless cellular telephone network, a Packet Cellular Network (PCN), Global System for Mobile Communications, (GSM), Generic Packet Radio Services (GPRS), network/Personal Communications Services network (PCS), a Cellular Digital Packet Data (CDPD), Wireless Application Protocol (WAP), Digital Audio Broadcasting (DAB) network or other types of computer networks. Wireless cellular telephone network can include, but is not limited to Code Division Multiple Access (CDMA), Time Division Multiple Access (TDMA), or other wireless technologies.

In an embodiment, harvesting engine 102 and ranking engine 104 generally comprise processor 110 and memory 112 that are programmed and/or configured to execute and/or implement the processes as described in the various embodiments.

Processor 110 can be any programmable device that accepts digital data as input, is configured to process the input according to instructions or algorithms, and provides results as outputs. In an embodiment, processor 110 can be a central processing unit (CPU) configured to carry out the instructions of a computer program. Processor 110 is therefore configured to perform basic arithmetical, logical, and input/output operations.

Memory 112 can comprise volatile or non-volatile memory as required by the coupled processor 110 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. In embodiments, memory 112 can further comprise data storage as implemented by general purpose database management storage system (DBMS) as implemented by, for example, Oracle, IBM DB2, Microsoft SQL Server, PostgreSQL, MySQL, and SQLite solutions. In embodiments, memory 112 can comprise flat file data storage. The foregoing lists in no way limit the type of memory that can be used, as these embodiments are given only by way of example and are not intended to limit the scope of the invention.

As depicted in FIG. 2, harvesting engine 102 and/or ranking engine 104, via processor 110 interface with one or more databases 108a-108c. Databases 108a-108c can comprise individual very large resources, such as the Internet or reference or library databases. For example, database 108a can comprise the collection of granted U.S. patents and published U.S. applications. Database 108b can comprise the collection of granted European patents and published European applications. Database 108c can comprise the Internet. Other databases can include, for example, Google Scholar's collection of non-patent literature, American Heart Association published articles, IEEE published journal articles, and so on. In another embodiment, databases 108a-108c can comprise relational databases, general-purpose DBMSs, flat files, and so on. The number and type of databases to which harvesting engine 102 and/or ranking engine 104 can interface with are unlimited. As will be described, depending on the seed set and other user input, the quantity and specific databases 108a-108c can be varied.

Further, as depicted in FIG. 2, a single processor 110 is configured to interface with databases 108a-108c as part of both harvesting engine 102 and ranking engine 104. In alternative embodiments, as described above, multi-processor or multi-core embodiments are also considered. In an embodiment, ranking engine 104 is configured to operate on databases 108a-108c based on the data provided by harvesting engine 102. For example, harvesting engine 102 can provide links or trace data to ranking engine 104 that points to locations within databases 108a-108c so as to define the silo of references to be ranked. Such embodiments therefore need no local storage of the harvested references, other than pointer directives. However, in an embodiment, once harvesting is completed by harvesting engine 102, ranking by ranking engine 104 need not necessarily interface to databases 108a-108c. As will be described below with respect to FIG. 4, ranking engine 104, in an embodiment, is configured to operate on the set of harvested references, as stored by harvesting engine 102 within memory 112 or any other storage device, without interfacing to any of databases 108a-108c.

User 114 can connect to harvesting engine 102, ranking engine 104, or both, via interface 106. User 114 can comprise, for example, a Patent Examiner, a professional patent searcher, other patent professional, individual inventor, IP insurance underwriter, or corporate officer, in embodiments. User 114 can be located proximate harvesting engine 102 and ranking engine 104 in embodiments, or remote from harvesting engine 102 and ranking engine 104, in other embodiments.

Figure 4A:
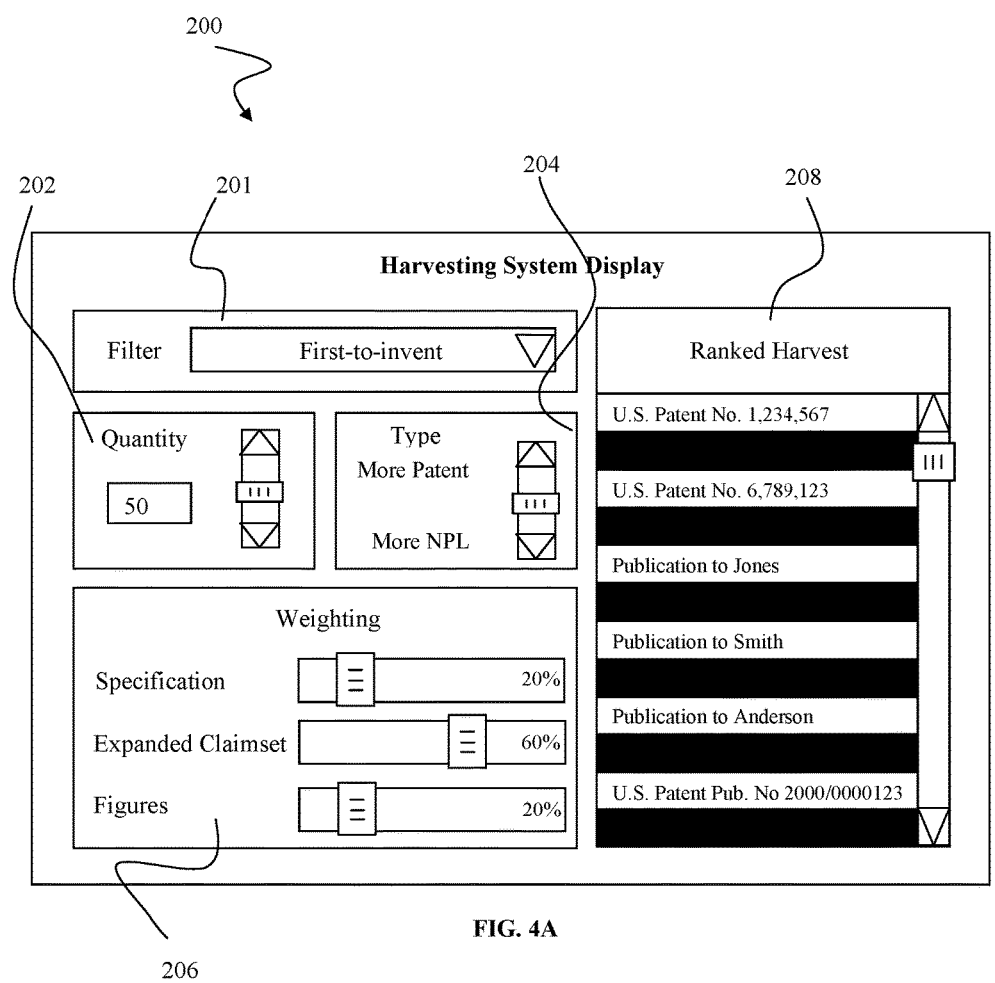
FIG. 4A is a block diagram of the interface of FIGS. 1-2 showing a ranked harvest list, according to an embodiment.

Referring to FIG. 4A, interface 106 can comprise computerized reference analysis system display 200. User 114 can interact with and manipulate various fields within display 200 in order to present the ranked harvest as user 114 desires. In an embodiment, display 200 is presented to user 114 after user 114 was presented with and selected from the databases to be searched, for example, databases 108a-108c, and an at-issue reference is chosen as the input for the relevance rankings. In the embodiment of display 200 as depicted, databases 108a-108c can comprise, for example, a collection of U.S. granted patents, a collection of U.S. published applications, and a collection of non-patent literature. Links to other reference search tools or websites can also be utilized.

Display 200 comprises filter field 201, quantity field 202, type field 204, weighting field 206, and ranked harvest result field 208.

Filter field 201 provides a graphical user interface to specify the type of priority date for the harvested references. Filter field 201 can comprise, in an embodiment, an interactive drop-down list where elements of the list correspond to the different types of priority dates corresponding to known patent systems, such as "first to invent," "first inventor to file," and "first to file." Particular references or sets of references are thereby filtered according to the relevant priority date of that particular system, according to the pseudocode of Formula 1. For example, a reference with a priority date earlier than the critical date of the at-issue reference when filter field 201 is selected for a first-to-file system will be hidden from view in ranked harvest result field 208. However, that same reference with a priority date later than the critical date of the at-issue reference when filter field 201 is selected for a first-to-invent system will potentially appear in ranked harvest result field 208 (of course, based on the other selections by user 114 within display 200). In embodiments, semaphores or flags are used to identify each of the references with respect to the filter such that actions by user 114 within quantity field 202, type field 204, and weighting field 206 apply to all harvested references, but identified filtered references do not appear in ranked harvest result field 208. In other embodiments, filtered references are removed from the applicable database such that actions by user 114 within quantity field 202, type field 204, and weighting field 206 do not apply to these filtered-out references (and likewise do not appear in ranked harvest result field 208. Given this flexibility, embodiments can efficiently operate on the harvested references. Embodiments of computerized reference analysis system 100 are therefore configured to be flexible for use across multiple patent systems. Such filtering is useful for numerous users 114, who often work across multiple patent systems.

if (filter=="first-to-invent")

then limit by invention date else if (filter=="first-inventor-to-file")

then limit by priority date of filing date after invention else if (filter=="first-to-file")   Formula 1 then limit by filing date

Quantity field 202 provides a graphical user interface to specify the number of ranked harvest references to display. Quantity field 202 can comprise, in an embodiment, an interactive text box that corresponds to the number of ranked harvest references displayed in ranked harvest result field 208. The text box is configured to receive user 114 input in a numerical format. In another embodiment, quantity field 202 comprises a slider bar that likewise corresponds to the number of ranked harvest references displayed in ranked harvest result field 208. In another embodiment, quantity field 202 comprises both a text box and slider bar as depicted in FIG. 4A. In such an embodiment, the slider bar and text box can be operably coupled such that manipulation of one graphically changes the other.

Type field 204 provides a graphical user interface to specify the type of ranked harvest references to display. Type field 204 can comprise a slider bar that corresponds to the type of ranked harvest references displayed in ranked harvest result field 208. In the embodiment of display 200, a sliding scale of patent references or non-patent references are selectable by the slider bar. For example, if the slider bar is directed toward "More Patent" references, ranked harvest result field 208 becomes populated with more patent references as compared to NPL references. Similarly, the opposite is true if the slider bar is directed toward "More NPL" references; more NPL references are populated within ranked harvest result field 208 as compared to patent references. In another embodiment, type field 204 can comprise a text box or series of text boxes that receive as input, for example, percentages of each type. In an embodiment, if only one type of database is previously chosen, type field 204 can be ghosted or grayed out so as to not accept user input. For example, if only a patent reference database is previously chosen, the distinction between NPL and patent references becomes moot, and therefore, the slider bar of type field 204 would be unselectable. Generally, the proportion of patent references to NPL references as applied to the total quantity can be calculated based on inputs from type field 204 and quantity field 202 according to Formulas 2A and 2B, in an embodiment.

Patent Quantity=Total Quantity*(Patent Percentage/ 100)   Formula 2A

NPL Quantity=Total Quantity*(NPL Percentage/100)   Formula 2B

Weighting field 206 provides a graphical user interface to specify the relative weighting of ranked harvest references to display. As is described below, and specific to the patent reference context, particular references or sets of references can be "related" to the search terms or search string of the seed set based on the specification of the at-issue reference, based on the claims of the at-issue reference, or based on the figures of the at-issue reference, for example. Weighting field 206 therefore comprises a set of three slider bars that correspond to the weighting of ranked harvest references displayed in ranked harvest result field 208. Specifically, a specification slider bar specifies how much of the specification of the references should relatively be applied, a claimset slider bar specifies how much of the claimsets of the references should relatively be applied, and a figures slider bar specifies how much of the figures of the references should relatively be applied. As depicted, the weighting is given 20% to the specification, 60% to the claimset, and 20% to the figures. In embodiments, the specification, claimset, and figures the slider bars can be operably coupled such that manipulation of one graphically changes the other(s). In another embodiment, weighting field 206 can comprise a text box or series of text boxes that receive as input, for example, percentages of each weighting measure.

Ranked harvest result field 208 provides a graphical user interface of ranked harvest references. Specifically, ranked harvest result field 208 comprises a list of results of the top-ranked references as determined by the criteria specified by filter field 201, quantity field 202, type field 204, and weighting field 206 for the database(s) selected. In an embodiment, a scroll bar allows user 114 to view more of the references or scan down the list. In an embodiment, by clicking or double-clicking on a particular row, the full reference depicted by that row is presented.

Figure 4B:
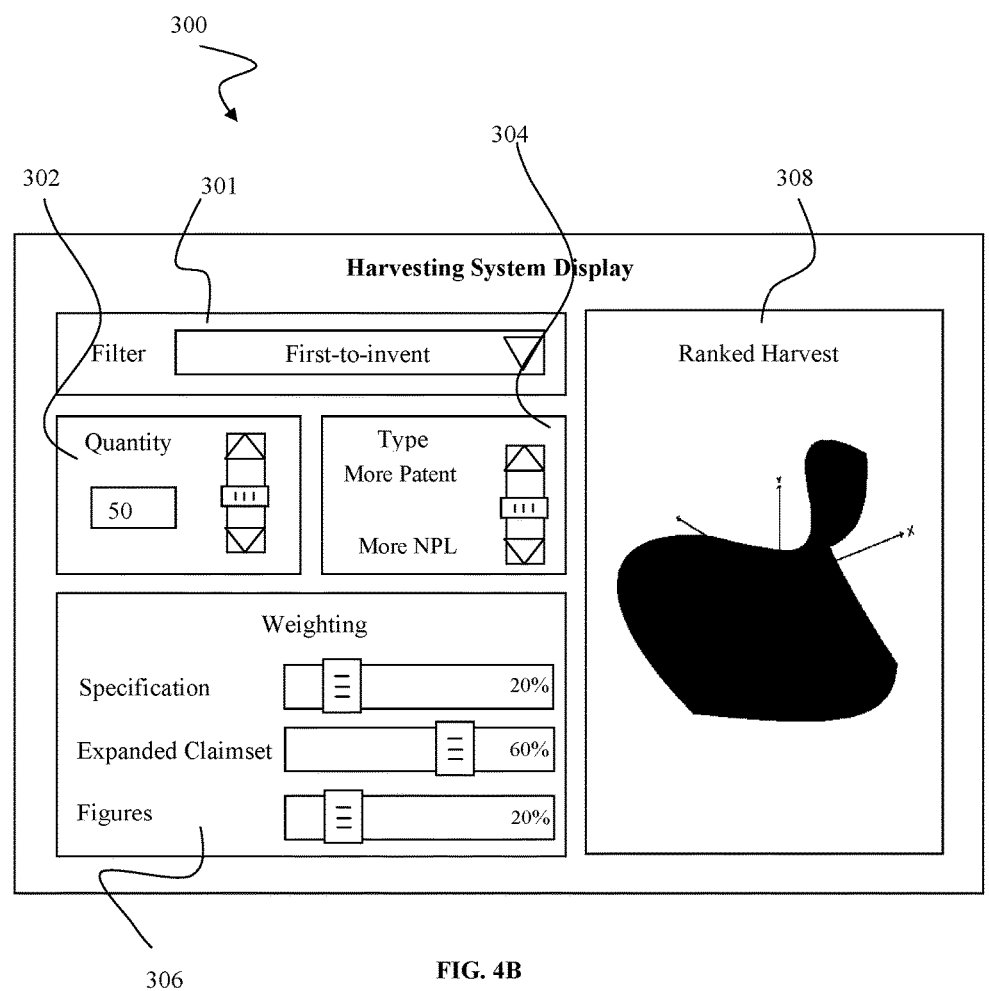
FIG. 4B is a block diagram of the interface of FIGS. 1-2 showing a ranked harvest three-dimensional surface graph, according to an embodiment.

Referring to FIG. 4B, interface 106 can further comprise harvesting system display 300. Display 300 is substantially the same as display 200, comprising filter field 301, quantity field 302, type field 304, and weighting field 306. Instead of a list of results as in ranked harvest result field 208, ranked harvest result field 308 comprises a graphical display of the ranked harvest. Ranked harvest result field 308 provides a graphical user interface of ranked harvest references. Specifically, ranked harvest result field 308 comprises a three-dimensional surface graph that illustrates the state of the art of the harvested references. In an embodiment, axes reflected by the specification, claimset, and figures give the graphed shape its parameters.

In another embodiment of a display, the output of the ranking represents a three-dimensional surface graph that shows on the axis the plane of the at-issue reference chosen as the input for the relevance rankings, and an identification of the references in the silo storing the set of harvested references. A surface plot on the three-dimensional graph can then indicate the relative reference relationship among the claims of the at-issue reference and the harvested references. In one embodiment, a user is able to selectively indicate whether to have the graphical output present only a single claim, all independent claims, or both independent and dependent claims. In another embodiment, the three-dimensional surface graph is portrayed in relationship to segregated claim elements, instead of claims, in order to show topographical high points of references that may be used for obviousness combinations.

In an embodiment, a three-dimensional surface graph can be manipulated by user 114 according to any number of criteria. In an embodiment, individual claim elements can be highlighted and thereby given additional weight, thus changing one or more axes of the graph and the shape of the three-dimensional surface. In another embodiment, manipulating individual claim elements changes the surface of the relative "bottom" of the three-dimensional surface graph. In embodiments, this bottom cutoff surface is depicted as slicing through the body of the three-dimensional presentation of relevancy data and can be used as a cutoff point for identifying the most relevant references. The bottom cutoff surface is configurable to be raised or lowered relative to the projection of the three-dimensional surface in order to include a greater or lesser number of references. In another embodiment, the user 114 can alter the shape of the bottom cutoff surface in order to adjust the most relevant references that are above or below a bottom cutoff surface.

Figure 5:
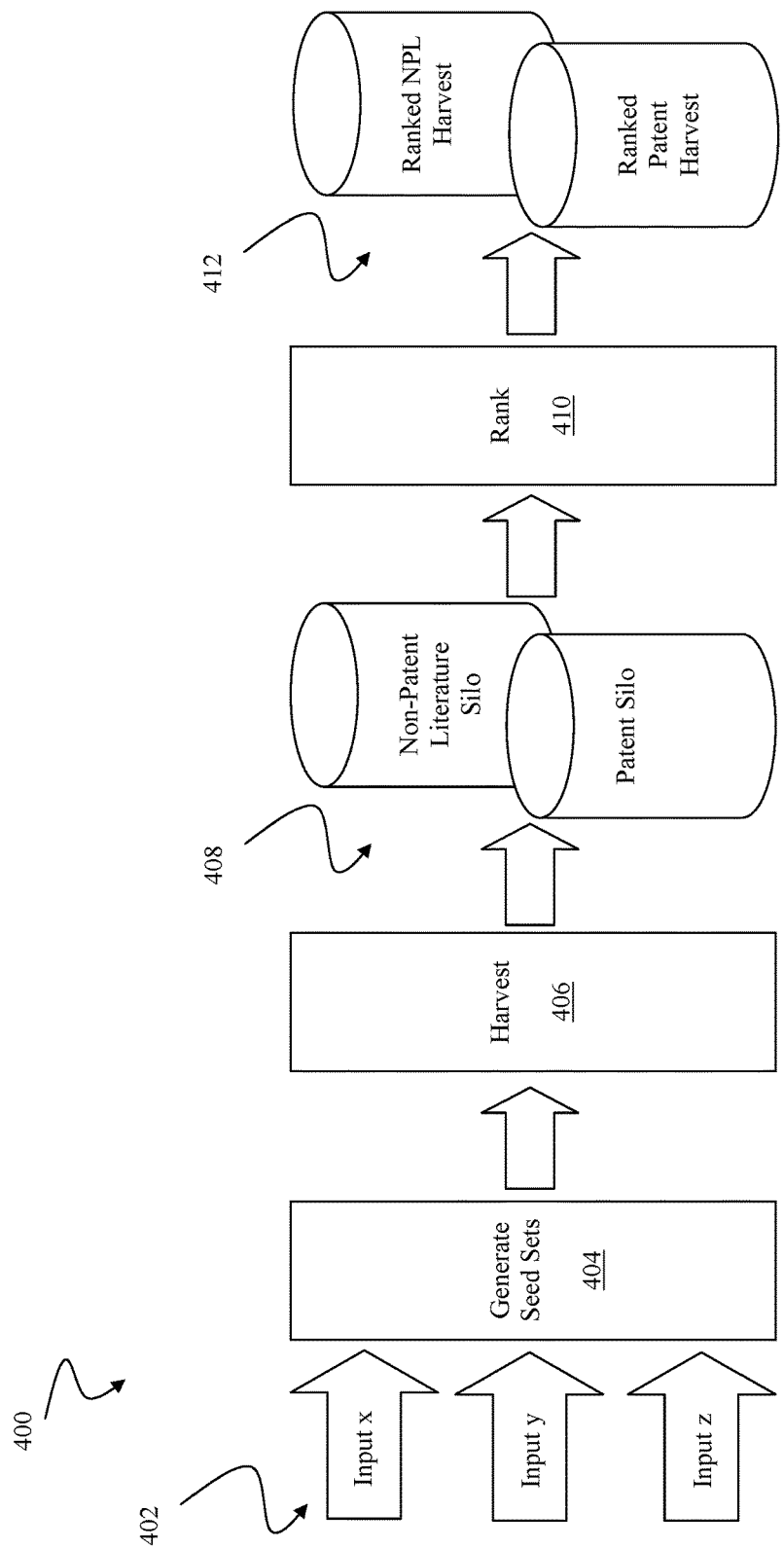
FIG. 5 is a flowchart of a harvesting and ranking process, according to an embodiment.

In operation, referring to FIG. 5, steps defining a method 400 of harvesting and ranking a collection of references according to an embodiment, are depicted.

Referring to step 402, input is received to drive the creation of seed sets. As depicted in FIG. 5, input x, input y, and input z are considered. For example, input x can be an inventor-drafted invention disclosure, input y can be receiving a known patent reference in the field of the disclosure, and input z can be a preliminary image search based on a figure of the invention disclosure. In another embodiment, the number of generations of forward and backward citations of references grown by the respective seed sets is received as input. More or less input criteria can be considered, in embodiments. If necessary, the input is analyzed or otherwise reduced by user 114. For example, an invention disclosure can be read by user 114 in order to synthesize the key aspects of the disclosure into a select set of key terms. In another embodiment, an invention disclosure can be passed directly as an input without synthesizing by user 114.

At step 404, seed sets are generated. In an embodiment, a seed set is identified by keyword, semantic, classification, and/or index search. In another embodiment, a seed set can represent manually identified references. Preferably, at least one seed set of references represents patent references and another seed set of references represents non-patent references. In some embodiments, multiple seed sets are provided with different seed sets representing references that are more likely to be found together, such as patent references issued or published by different patent offices.

A single seed set as generated by step 404 can be derived from a single input of step 402, in an embodiment. In other embodiments, a single seed set as generated by step 404 can be derived from multiple inputs of step 402. Continuing the example from step 402 with inputs x, y, and z, and for ease of explanation, a single seed set is derived from a single input. For example, input x can promulgate a seed set of keyword, semantic, and classification search terms or classifications based on the inputted inventor-drafted invention disclosure. In an embodiment, input y of a known patent reference or references can promulgate a seed set of a generational tree based on the backwards and forwards citations of the inputted patent references. In another embodiment, a seed set is generated at step 404 by the results of input z, a preliminary search; for example, the results of an image search. In an embodiment, a raw invention disclosure or other describing document can be automatically parsed for keywords and preliminary search terms can then be created without user 114 interaction.

At step 406, harvesting is conducted. In an embodiment, for example, of computerized reference analysis system 100, harvesting engine 102 conducts the harvesting. Based on the seed sets created in step 404, the specified databases are automatically searched. In an embodiment, for example, using a seed set of a single patent reference, a tree search process of harvesting of relevant references is conducted. The tree search can traverse a specified number of generations of forward and backward citations of the references starting from the seed set reference. In embodiments, the tree search is expanded to search the forward and backward citations of each subsequent generation of all of the potentially relevant references identified in the iteration of the previous generation.

In an embodiment, harvesting engine 102, as part of harvesting at 406, is configured to create a secondary database prior to the traversing of references for relevant references. Such a secondary database can be, for example, a structured or organized database or set of references that enables the subsequent traversing of references. For example, in the tree search described above, harvesting engine 102 is configured to create a secondary database that comprises the forward and backward citations corresponding to the branch and root structure that enables tree traversal.

In an embodiment, harvesting engine 102 can interface with a non-organized set of references such as databases 108a-108c, analyze the references or information of other references cited by the at-issue references, and create a secondary database that captures the citation relationship between references. In an embodiment, a root reference is defined as a bibliographic reference cited by an at-issue reference with a date prior to the date of the at-issue reference. In an embodiment, a branch reference is defined as a citing reference that cites to the at-issue reference with a date after the date of the at-issue reference. Harvesting engine 102 is therefore configured to create root and branch relationships between the references of database 108-108c.

For example, considering an at-issue reference, harvesting engine 102 is configured to cull from the text of the at-issue reference, the bibliography, or any other further information included as part of the reference, references cited by the at-issue reference. In the case of a patent application reference, the patent prosecution history is one example of such further information. In an embodiment, these cited references can be stored, in the secondary database, as root references to the at-issue reference. In other embodiments, the root reference relationship is otherwise captured as part of the secondary storage.

In embodiments, other searches can be utilized to find branch references of the at-issue reference. For example, a search for an identifying number of the at-issue reference can be conducted by harvesting engine 102 in order to find references citing to the at-issue reference. In an example, in the case of a patent application reference, the patent prosecution history of a patent application with a date subsequent to the date of the at-issue reference can reference the at-issue reference. In an embodiment, these citing references can be stored, in the secondary database, as branch references to the at-issue reference. In other embodiments, the branch reference relationship is otherwise captured as part of the secondary storage. In other embodiments, branch references can be mined to identify potential further root references of the branch reference which may also pre-date the date of the at-issue reference. For example, referring to FIG. 6, a multigenerational tree of forward and backward citation references is depicted for primary references Reference A, Reference B, and Reference C, which comprise the seed set in this example. In an embodiment, the creation of a secondary database by harvest engine 102 as described above can comprise storing the structure or relationships between references of FIG. 6 in a database or other appropriate storage structure. Reference A contains Reference D, Reference E, and Reference F as cited references. Such citations can be, for example, in an Information Disclosure Statement cited by the applicant of Reference A, or in a form PTO-892 as cited by the examiner in Reference A. Likewise, Reference B contains citations to Reference H and Reference I. Reference C contains citations to Reference J, Reference K, and Reference L. Therefore, Reference D, E, F, H, I, J, K, and L comprise the set of forward secondary references. Returning to Reference E, citation is made within Reference E to Reference M and Reference N. Thus, References M and N comprise the set of forward tertiary references. The set of forward primary, secondary, and tertiary references can therefore comprise a multigenerational tree having root and branch structure based on a seed set. A depth value can therefore define the multigenerational forward/backward citation levels in a root and branch tree structure to be searched. Continuing depths past the set of tertiary references are, of course, also possible.

A similar backwards-focused addition to the tree can be based on the backward citation of references. Referring again to FIG. 6, the same set of primary references Reference A, Reference B, and Reference C comprise the seed set in this example. A backward secondary set of references comprising the set of Reference TT, Reference UU, Reference VV, Reference WW, Reference XX, Reference YY, and Reference ZZ are references citing References A, B, and C, respectively. As in the forward citation references, citation can be made for example, in an Information Disclosure Statement as cited by the applicant, or in a form PTO-892 as cited by the examiner. A backward tertiary set of references of Reference PP, Reference QQ, Reference RR, and Reference SS comprise the set of references citing References TT, UU, VV, WW, XX, YY, and ZZ. In embodiments, combinations of various depths of backwards and forwards citation of the inputted references can be utilized in promulgating the seed set. Embodiments of the multigenerational forward/backwards citation levels in a root and branch tree structure can also be applied to other types of references, such as references identified in bibliographies of academic articles or books.

Figure 6:
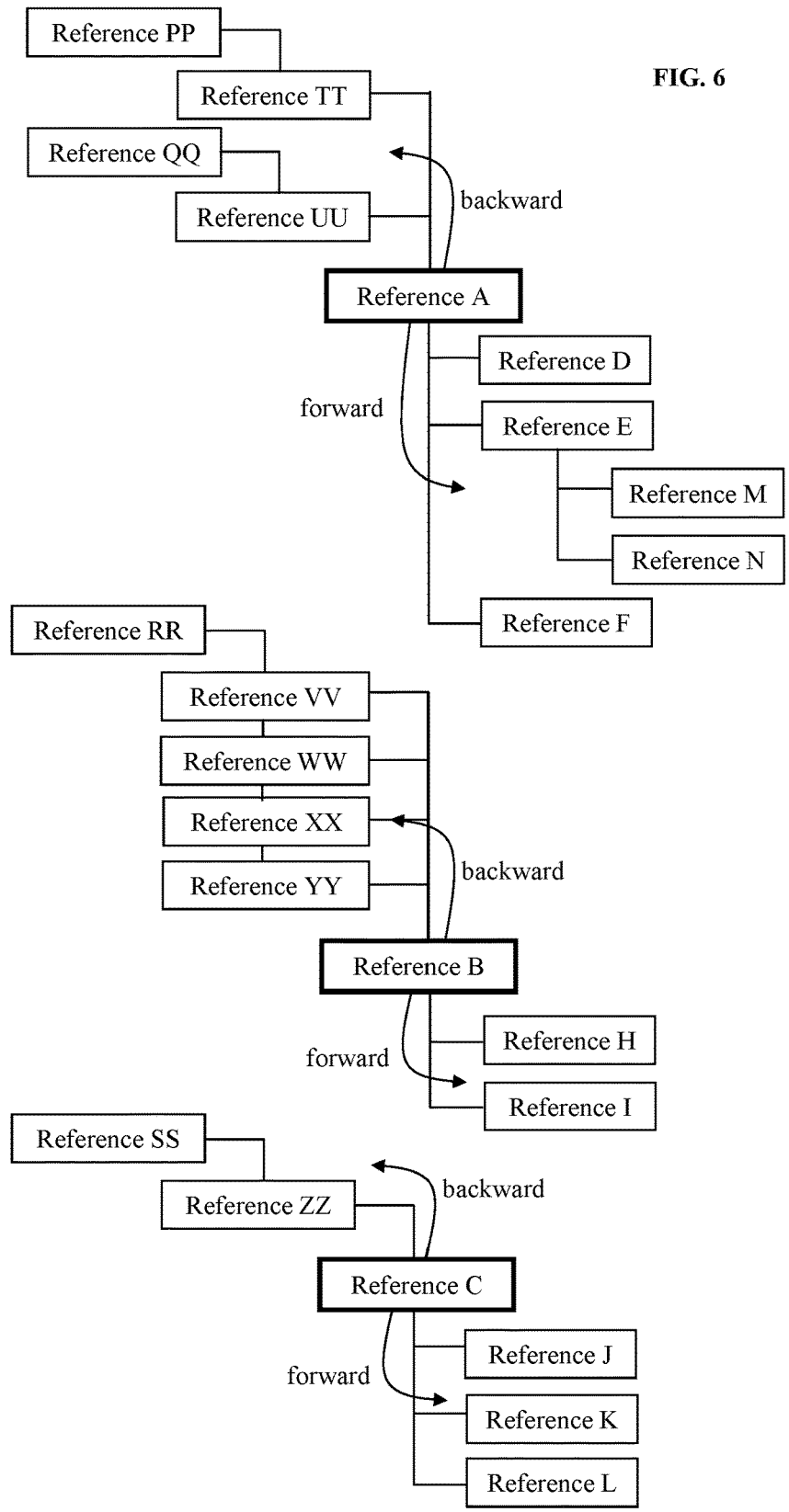
FIG. 6 is a block diagram of a generational tree based on the forward and backward citations of a seed set of references, according to an embodiment.

In an embodiment, harvesting engine 102 can create the multigenerational tree of FIG. 6 that comprises root references and branch references for the respective primary references. Referring again to Reference A of FIG. 6, References D, E, and F can be created as root references of Reference A via the cited reference identification procedure described above. Such a relationship can be stored in the organized secondary databases described above. Similarly, should such citation levels be desired, References M and N can be created as root references of Reference E. References M and N therefore have a secondary root relationship to Reference A.

Likewise, as described above, branch references can be created. Referring again to Reference A, searches or other identification procedures can be conducted or utilized to identify References TT and UU, which are branch references to Reference A. Again, should such citation levels be desired, Reference PP can be created as a branch reference of Reference TT, and Reference QQ can be created as a branch reference of Reference UU via the citing reference identification procedure described herein. References PP and QQ therefore have a secondary branch relationship to Reference A.

According to an embodiment, where each of the primary references A, B, and C are viewed as nodes, the tree can be traversed according to the pseudocode of Formula 3.

traverse (node, direction, depth)

if (node==null) then return get (node.value)

if (direction==forward && depth≤forward_depth)

then traverse (node.forward)
forward_depth+1 else if (direction==backward && depth≤backward_depth)   Formula 3 traverse (node.backward)
backward_depth+1

In an embodiment, after all of the branches and roots of the multigenerational levels of the branch and root tree structure search are explored, the priority/publication dates for the complete set of potentially relevant references can be compared to a specified critical date to remove references that are likely not to be considered prior art. In another embodiment, the priority/publication dates for the references can be compared to a specified critical date as part of the filtering process as applied to all of the set of potentially relevant references, for example, that described above with respect to filter field 201 and filter field 301.

Finally, the complete set of potentially relevant references can be de-duplicated such that only unique references remain in the set of harvested references. Typically, the process of de-duplication must be done as the last step prior to concluding a set of harvested references so as to not lose any branches of the tree structure. This filtered, de-duplicated set of potentially relevant references can then be used as the set of harvested references.

In an embodiment, for example, using a seed set of, for example, keyword, semantic, or classification search terms or classifications based on the inputted inventor-drafted invention disclosure, or, similarly, a preliminary image search based on a figure of the invention disclosure, harvesting can be conducted as described above with respect to the tree traversal of a single reference, but one abstracted step prior, where every result in the preliminary search can be traversed as its own tree. For example, in a preliminary search resulting in five references, five trees are therefore presented.

The references are harvested according to Formula 4, according to an embodiment.

Σ Seed Set results for Seed Set=1 to Seed Set=$n$,
        where $n$=the total number of seed sets     Formula 4

At step 408, the resulting silos of harvested NPL and patent references, respectively, are created. In an embodiment, the resulting harvest can be stored as pointers to the relevant references, with pointers pointing to the references contained in the searched databases. In another embodiment, the resulting harvest can be stored as copies of the relevant references physically stored within computerized reference analysis system 100.

At step 410, the silos created by step 408 are ranked. In an embodiment, for example, of computerized reference analysis system 100, ranking engine 104 conducts the ranking. In an embodiment, ranking engine 104 uses the entire claim set of a given patent or patent application as the input for the relevance rankings. In one embodiment, the use of the entire claim occurs in an expanded form in which each dependent claim includes a repetition of all of the verbiage of the underlying dependent and independent claims.

Referring to FIG. 7A, an example expanded claimset that can be input to ranking engine 104 is depicted. Claims 2-5, when written in expanded form, includes repetition of all of the verbiage of the underlying independent and dependent claims (where applicable). For example, claim 2 includes all of the elements of claim 1, as well as the additional element "wherein at least one of the first strap and the second strap is of a resilient material." Claim 5 includes all of the limitations of claim 1, as well as the additional limitations of claim 4, of "stitching; and the loose ends of the first strap and the second strap are movably secured to the shell of the hat with the stitching," as well as the claim 5 unique limitation of "wherein each loose end of the first strap and the second strap includes a knot to prevent each loose end from sliding out of the stitching." Therefore, the repetition of the underlying base claim elements factors into the relevance ranking of ranking engine 104.

Myriad natural language parsers and text analyzers are known to handle language parsing. The text parsing and analysis can be as intricate or basic as desired for the particular reference or subject matter. For example, in parsing claim 1 for relevant claim elements, transition words such as "a," "the," and "at," etc. are filtered out to expose the true claim elements that are unique to the reference at issue. Elements that are two or more words, but only a single element as read by typical claim construction, are considered together. FIG. 7B illustrates the results of the parsing and analysis of claim 1. The elements "hat," "first strap," and "second strap" occurred the most, with the elements "animal," "secured," and "shell" of an intermediate frequency, and the elements "loose end," "arrangement," and "movably" of a lesser frequency. Frequencies can be calculated according to the iterative formula of Formula 5, according to an embodiment. Appropriate rankings can then be given by numerically ordering the returned frequency of each word. In another embodiment, transition words are removed from the total word count to provide a more meaningful comparison of substantive words.

Frequency (word)

$$\text{return occurrence (word)/total\_words} \quad \text{Formula 5}$$

Frequency (next_word)

Considering the parsing and analysis of claim 5 of FIG. 7A, as summarized by FIG. 7C, the claim element "stitching" now appears among the top claim elements, as it is relevant in dependent claim 5. Referring to FIG. 7D, which summarizes the parsing and analysis of claim 6, which depends from claim 5, the repetition of all of the verbiage of the underlying claims illustrates how key claim elements can be fleshed out using the expanded form for dependent claims. The claim element "loose end" occurs more frequently as a result of the dependency of claim 6 on claim 5 and is therefore placed among the top claim elements, along with "hat," "first strap," and "second strap."

Figures 7E, 8A:
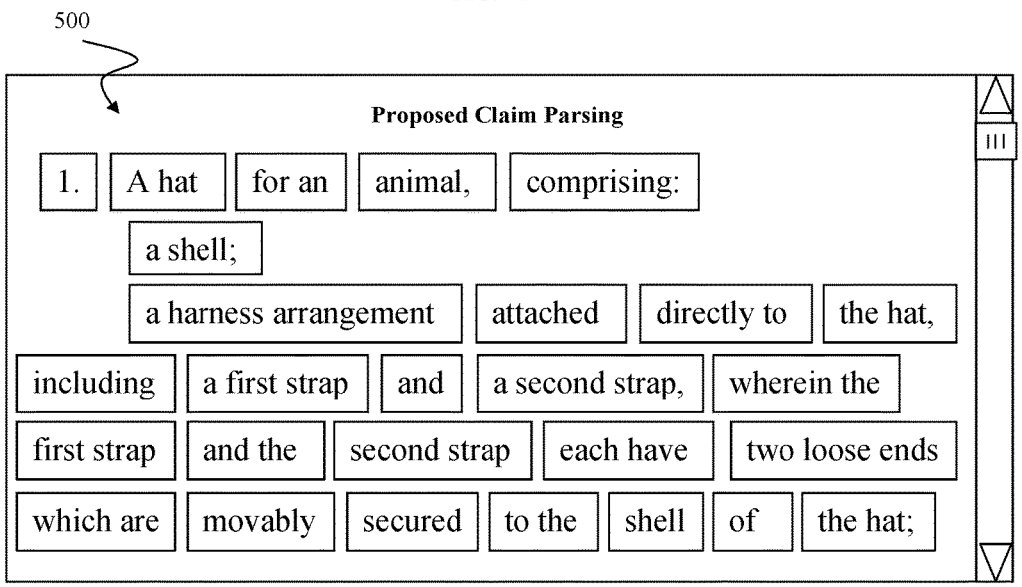
FIG. 7E is a summary table of the expanded claimset of FIG. 7A, after claim element parsing and analysis, according to an embodiment.
FIG. 8A is a proposed claim parsing display of the expanded claimset of FIG. 7A, according to an embodiment.

This methodology can be applied to the entire claimset. Referring to FIG. 7E, which summarizes the parsing and analysis for claim elements of the entire claimset, by parsing and analyzing the claimset as a whole in expanded form as described above, the entire reference as a whole, as applied to the claims, can be discerned. For example, the claim element "animal" jumps to an intermediate frequency when analyzed from the perspective of the expanded claimset, as compared to, for example, the separate analyses of claims 5 and 6 as summarized in FIGS. 7C and 7D where the element "animal" appears as one of the most infrequent terms. Therefore, in embodiments, ranking engine 104 can use the expanded claimset or portions of the expanded claimset as input for the relevance rankings.

In another embodiment, referring to FIG. 8A, ranking engine 104 provides a proposed claim parsing 500. A portion of claim 1 of FIG. 7A is displayed in FIG. 8A. Proposed claim parsing 500 can appear in a user interface window similar to display 200 or display 300. As depicted, each of the elements or combination of elements is parsed and displayed in a separate box. Each box therefore comprises a separate claim element or combination of elements that will drive the ranking.

The proposed claim parsing 500 can utilize the forms of common claim construction, according to an embodiment. As such, the parser can rely on three key pieces of information that can be extracted from the claims. First, a basic understanding of words as part of basic semantic analysis can be utilized. In an embodiment, semantic analysis is available via the LexisNexis TotalPatent [TRADE] commercially software product. After semantic analysis, ranking engine 104 understands the operating words and the non-operating words within the claim. In a second piece of information, the parser can rely on punctuation commonly used within claims, such as commas, colons, and semi-colons. Third, the parser can rely on indentation such as tabbing, carriage returns, and simple spacing.

In an embodiment, the proposed claim parsing 500 can additionally propose a hierarchical relationship of the claim elements and sub-elements. In an embodiment, LexisNexis PatentOptimizer [TRADE], for example, provides an auto-generated claim hierarchy. In another embodiment, the parser can propose possible interrelationships between elements. For example, referring to claim 1 of FIG. 7A, the element "harness arrangement" operates on the element "hat" element by the harness arrangement attaching directly to the hat. Therefore, there is an interrelationship between "harness arrangement" and "hat."

In an embodiment, each of the claim elements, as analyzed and populated as parsed, is depicted as encapsulated in a box corresponding to a color, wherein similar claim elements are encapsulated boxes of the same color and differing claim elements are encapsulated in boxes of differing colors. In another embodiment, differing shapes are used to encapsulate differing claim elements and similar shapes are used to encapsulate similar claim elements. Other differing and similarity markings or encapsulations are also possible, including highlighting, font manipulation, capitalization, or any other suitable marking or encapsulation. Further, any of the above-mentioned additional hierarchical arrangements or interrelationships between elements can also be highlighted or encapsulated for user 114 viewing and/or review and manipulation.

Figure 8B:
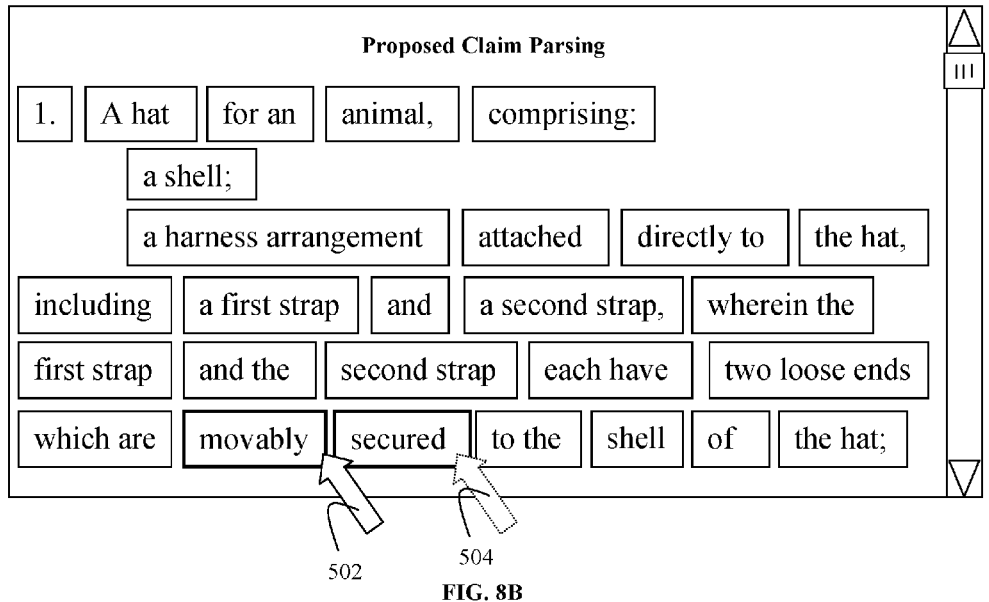
FIG. 8B is a proposed claim parsing display illustrating an editing of the expanded claimset of FIG. 7A, according to an embodiment.
Figure 8C:
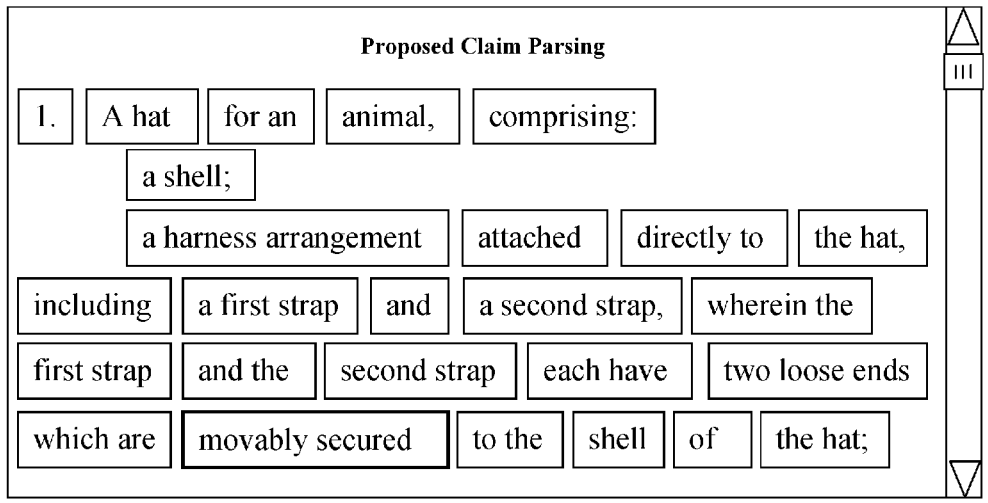
FIG. 8C is an edited proposed claim parsing display of the expanded claimset of FIG. 7A, according to an embodiment.

In an embodiment, the proposed claim parsing is editable by user 114. Referring to FIG. 8B, a cursor can be positioned and operated by user 114 to edit the initial proposal generated by ranking engine 104. For example, assume, in the in the depiction of FIG. 8B, the user 114 wishes to combine the element "movably" with the element "secured" to create a single element "movably secured." User 114 moves cursor 502 to select, by clicking or other operation, the element "movably." User 114 can then drag the element "movably" over to the element "secured," and release the cursor (or other operation), as for example shown by cursor 504. Referring to FIG. 8C, the elements "movably" and "secured" have then been combined into the single element "movably secured." Conversely, elements can be separated by double-clicking or other appropriate operation. Using the above-described element combining and/or separating operation, it is possible for any of the claim elements to be combined or separated. Likewise, any of the hierarchical arrangements or interrelationships between elements can be modified by user 114. Embodiments of ranking engine 104 therefore provide flexibility in analysis.

Figure 9:
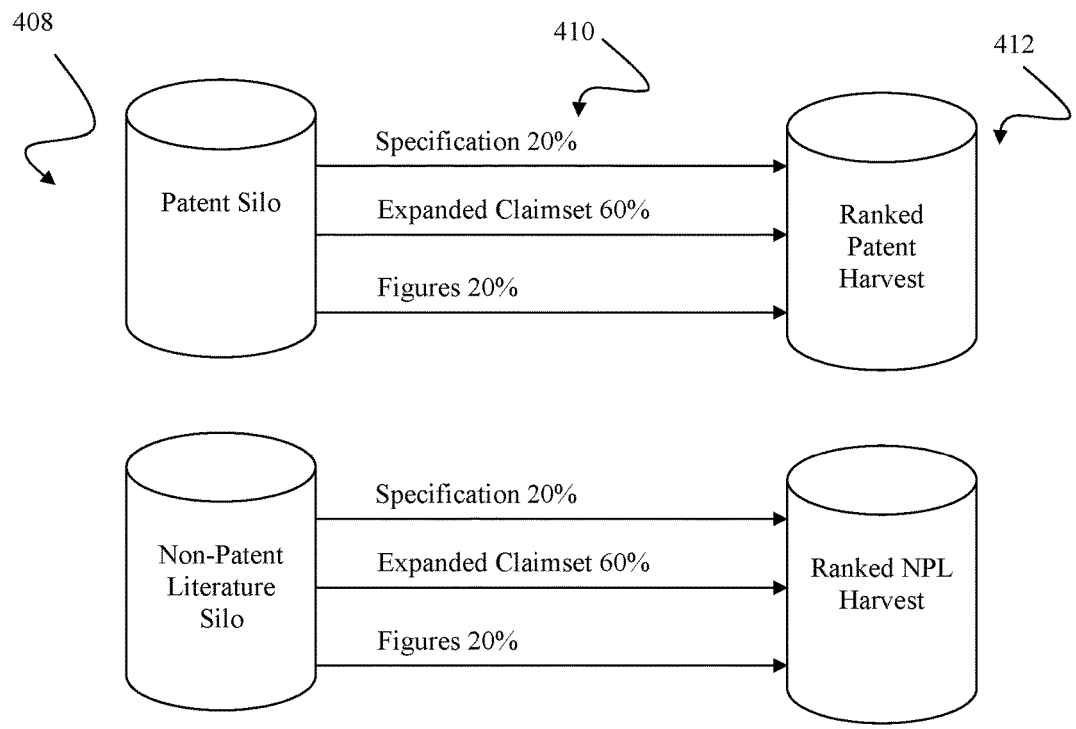
FIG. 9 is a flowchart of the ranking step of FIG. 5, according to an embodiment.
Figure 10:
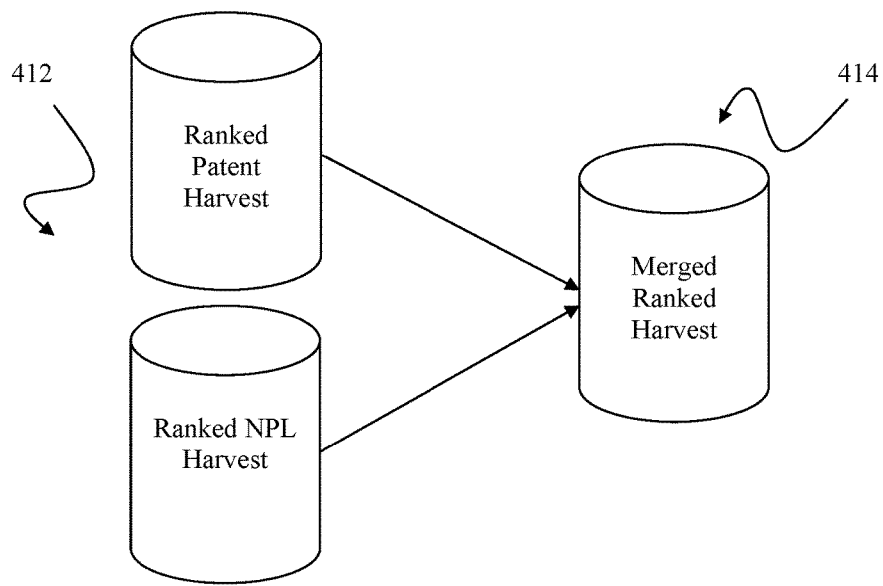
FIG. 10 is a flowchart of a merging step, and can be performed subsequent to the ranking step of FIG. 9, according to an embodiment.

Referring to FIG. 9, ranking engine 104 can use not only the expanded claimset or portions of the expanded claimset as the input for the relevance rankings, but also the specification (considered here as the text without the claimset), and/or the figures of the at-issue patent or patent application. As depicted in FIG. 9, weighting is given to each of the specification, expanded claimset, and figures of the at-issue patent or patent application in order to rank the harvested references. In other embodiments, only the figures are used as the input for the relevance rankings. In other embodiments, only the specification is used as the input for the relevance rankings. Any other relative weighting in between 0% and 100% of any of the combination of the three ranking categories are also considered, in other embodiments. In an embodiment, the weighting of any given display is calculated by the equation of Formula 6.

$$\text{Weighting} = \text{Specification}*(\text{Specification Percentage}/100) + \text{Claimset}*(\text{Claimset Percentage}/100) + \text{Figures}*(\text{Figures Percentage}/100) \quad \text{Formula 6}$$

In an embodiment, referring to display 200 and 300, and specifically, result field 208, a specification slider bar specifies how much of the specification of the references should relatively be applied, a claimset slider bar specifies how much of the claimsets of the references should relatively be applied, and a figures slider bar specifies how much of the figures of the references should relatively be applied. Threads parsing through each of the harvested references are configured to apply according to Formula 6, for example, the 20%-60%-20% weighting to each of the references and derive those references calculated to be higher or having more of the claim elements or terms, phrases, or other verbiage of the at-issue patent or patent application. Those calculated to be higher are thus ranked higher than those calculated to be lower and having fewer of the claim elements or terms, phrases, or other verbiage of the at-issue patent or patent application.

In embodiments, various implementations of regression analyses can be used to model and analyze the several variables, including as mentioned above, one or more variables for specification, claimset, and figures. In embodiments, then, the relationship of the dependent variable or variables can be determined by the relationship to the independent variable or variable of the at-issue reference.

Referring again to FIG. 5, at step 412, the resulting silos of harvested and subsequently ranked NPL and patent references are created. In an embodiment, the resulting ranked harvest can be stored as pointers to the relevant references, with pointers pointing to the references contained in the searched databases. In another embodiment, the resulting ranked harvest can be stored as copies of the relevant references physically stored within computerized reference analysis system 100.

Referring to FIG. 9, a merging step creating a merged ranked harvest silo can be performed subsequent to ranking step 410 after the ranked patent harvest silo and ranked NPL silo are created. Such merging can comprise storing all ranked NPL references and all ranked patent references as pointers to the searched databases, within, for example, memory 112. In another embodiment, the merged, ranked harvest can be stored as copies of the relevant references physically stored within computerized reference analysis system 100.

In an embodiment, referring to FIG. 11, a harvesting 406 subprocess of the harvesting and ranking process of FIG. 5 is illustrated. At step 414, the appropriate databases, each having a collection of references, are accessed. In an embodiment, as described above, processor 110 can access each of databases 108a-108c by operation of commands to databases 108-108c through a network. In another embodiment, processor 110 is configured to receive a set of a collection of references, thus accessing the references through input. At step 416, the collection of references are searched for relevant references, according to the previously-input seed set. Such searching can be, for example, a tree search, a keyword string search, a semantic search, an index search, or a classification search, as described above. At step 418, the relevant references are de-duplicated for duplicative references. At step 420, as in step 408, the resulting silo(s) of harvested references are created. The results of the harvested silo are de-duplicated, relevant references, according to the seed set. In embodiments, therefore, harvesting 406 can be conducted as a subprocess of the harvesting and ranking process 400 of FIG. 5, or as a discrete harvesting process on its own.

In an embodiment, referring to FIG. 12, a ranking 410 subprocess of the harvesting and ranking process 400 of FIG. 5 is illustrated. At step 422, a harvested collection of references is accessed. In an embodiment, as described above, processor 110 can access each of the harvested silos by operation of commands through a network. In another embodiment, processor 110 is configured to receive a collection of harvested references, thus accessing the references through input. At step 424, the harvested collection of references are filtered, according to one or more filtering criteria. For example, referring to FIG. 4B, the references can be filtered according to relevant priority date, quantity, and/or type of reference. Myriad other filtering criteria are also considered. At step 426, the filtered, harvested collection of references can be weighted. Referring to FIG. 9 and Formula 6 described above, when the collection of references are patent references, weighting is given to each of the specification, expanded claimset, and figures of the at-issue patent or patent application in order to rank the harvested references. Other weightings are also considered. In embodiments, filtering 424 and weighting 426 can be performed on the relevant in either order, or intertwined order, according to the type of results desired. For example, in an embodiment, the relevant results can be filtered by priority date and type, then weighted, then finally filtered for quantity. At step 430, as in step 412, the resulting silo(s) of harvested, filtered, and ranked references are created. In embodiments, therefore, ranking 410 can be conducted as a subprocess of the harvesting and ranking process 400 of FIG. 5, or as a discrete ranking process on its own.

EXAMPLE 1

Embodiments described herein are useful in numerous contexts and of value to many different types of users 114. For example, embodiments of computerized reference analysis system 100 can be applied to IP insurance underwriting by users 114 such as underwriters. IP insurance underwriters typically review and classify the technology of an applicant's products as a first step in searching for patents that have relevance to an applicant's products. The underwriter then performs keyword searches in each art area and searches backwards and forwards citations for the relevant patents. The underwriter can further search assignee names of companies and individuals who are known to compete or have markets in the identified art areas. Once the patents have been reviewed and distinguished from the applicant's products, underwriters provide a list of the patents searched. The above-described job description is in anticipation of issuing defense insurance policies, for example.

The harvesting and ranking provided by computerized reference analysis system 100 clearly provides automated and efficient support for underwriters in this context. Underwriters no longer need to be technology experts in reviewing and classifying the technology of an applicant's products. Instead, underwriters can rely on the words of the technology experts themselves, the inventors, in applying the inventor's seed sets to the databases searched. Further, manual backwards and forward citation searching is no longer required. Finally, the list of patents searched is automatically created by computerized reference analysis system 100 and displayed to user 114 by, for example, displays 200 and 300 of interface 106. Thus, embodiments of computerized reference analysis system 100 are beneficial to IP insurance underwriters.

EXAMPLE 2

In another example, embodiments of computerized reference analysis system 100 can be applied to the use and valuation of patent portfolios by users 114 such as corporate officers. In the context of an acquisition, for example, corporate officers often wish to evaluate the valuation of the acquisition target's portfolio. For example, it is critical to understand the competitors that may appear, for instance, repeatedly in the top 20 references of the target portfolio in order to factor in the nature of the field into the valuation. Likewise, it is useful to understand how any relevant references are applied to the target portfolio—whether by claim similarity, figures, or general specification discussion. Similar analysis can be useful in opportunity evaluation, such as competitive landscape issues; for example, determining the course of a business based on the crowdedness or availability of a particular art. Target licensee and infringer identification can also be conducted using similar methods. Further, such analysis can be useful in strategy development such as portfolio development, IP asset management, or commercialization strategies.

The harvesting and ranking provided by computerized reference analysis system 100 provides a readily presentable indication of the state of the art, including the names of top competitors. Not only are visual lists of the top competitors provided, but visual graphics of the state of the art are presented. The application of these references to the at-issue portfolio is easily manipulated by the weighting fields of, for example, displays 200 and 300 of interface 106. Thus, embodiments of computerized reference analysis system 100 are beneficial to those determining the valuation of patent portfolios. Further, based on the information provided by computerized reference analysis system 100, business decisions such as opportunity evaluation and strategy development are more easily made.

EXAMPLE 3

In another example, embodiments of computerized reference analysis system 100 can be applied to patent prosecution by users 114 such as patent attorneys or patent agents. Patent attorneys or patent agents typically conduct manual patent searches prior to drafting a patent application in order to understand the state of the art. The prudent patent attorney or patent agent will then analyze the most relevant references and subsequently draft the patent application after taking into consideration these references and their teachings. Further, patent searching can be conducted on its own for clients who wish to learn the state of the art, in conducting clearance opinions, and for myriad other reasons.

The harvesting and ranking provided by computerized reference analysis system 100 provides efficient searching and analysis of large databases of references. Time is saved by utilizing computerized reference analysis system 100 instead of manually searching the various reference databases. As a result, applications can be more timely written, and client money is saved because of the efficient searching and analysis. Further, better and more distinguished applications are written because the patent attorney or patent agent is able to easily consider the state of the art of the most relevant references due to, for example, displays 200 and 300, particularly the visual lists and graphs of ranked harvests. Additionally, the filtering provided by, for example, filter field 201 allows for flexibility among multiple patent systems. A single patent attorney or patent agent user 114 can therefore manipulate the ranked harvest based on the patent systems of multiple countries. Thus, embodiments of computerized reference analysis system 100 are beneficial to patent attorneys and patent agents.

EXAMPLE 4

In another example, embodiments of computerized reference analysis system 100 can be applied to patent prosecution by users 114 such as Patent Examiners. Patent Examiners review patent applications to determine if they meet certain criteria and standards to issue as granted patents. Typically, this is done by reviewing a large body of technical information, identifying the most relevant references within this large body, and applying portions of the identified references to a particular patent application. Such research, analysis, and application can be tedious and time-consuming and often requires tribal knowledge of particular references or databases.

As illustrated above, the harvesting and ranking provided by computerized reference analysis system 100 allows an Examiner to quickly and readily identify the most relevant references based on a particular application's claimset by looking at and interacting with components of interface 106, even without extensive knowledge of a particular reference or database. Further, via interface 106, the Examiner can quickly and readily determine precisely where within these particular relevant references the language of the claim element components are located. Thus, embodiments of computerized reference analysis system 100 are beneficial to Patent Examiners.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be formed or combined. Accordingly, the embodiments are not mutually exclusive combinations of features; rather, the invention may comprise a combination of different individual features selected from different individual embodiments, as understood by persons of ordinary skill in the art.

The entire content of each and all patents, patent applications, articles and additional references, mentioned herein, are respectively incorporated herein by reference.

The art described is not intended to constitute an admission that any patent, publication or other information referred to herein is "prior art" with respect to this invention, unless specifically designated as such. In addition, any description of the art should not be construed to mean that a search has been made or that no other pertinent information as defined in 37 C.F.R. § 1.56(a) exists.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A computerized reference analysis system comprising:
   a database storing a digital representation of references in a collection of references, each reference being an instantiation of information for a patent, patent application, publication, presentation, recording, use, or sale that is publicly accessible as of a date and includes further information of other references cited by a particular reference;
   a harvesting engine comprising a harvesting processor and a harvesting memory, the harvesting engine configured to:
      create a root and branch tree structure database from the database, the root and branch tree structure database storing the collection of references as root references and branch references based on citations of the respective references;
      receive at least one input for the generation of a seed set of potentially relevant references,
      interface with the root and branch tree structure database;
      search the root and branch tree structure database for relevant references, according to the seed set for a selectable number of generational levels of root references and branch references in the root and branch tree structure database; and
      de-duplicate the relevant references;
   a ranking engine comprising a ranking processor and a ranking memory, the ranking engine configured to interface with the relevant references and order the relevant references as a set of ranked references; and
   a graphical user interface configured to:
      present a quantity field configured to receive a quantity input from a user, the quantity input including a number of desired references in the set of ranked references,
      present a type field configured to receive an emphasis type input from the user, the emphasis type input configured to be read by the ranking engine to dynamically include or exclude particular references from the relevant references based on a relative emphasis between at least two predefined types of references,
      present a weighting field configured to receive a weighting input from the user, the weighting input configured to be read by the harvesting engine to dynamically re-search the root and branch tree structure database for relevant portions of references according to the weighting input corresponding to that portion, and
      present a ranked harvest summary display of the set of ranked references according to the quantity input, the emphasis type input, and the weighting input, wherein the set of ranked references is limited by the quantity input.

2. The computerized reference analysis system of claim 1, wherein the at least two preset types of references include patent references and non-patent literature references.

3. The computerized reference analysis system of claim 1, wherein the weighting field includes:
   a specification slider bar configured to be manipulated by the user to define a relative emphasis for a specification of a particular reference in the relevant references;
   a claimset slider bar configured to be manipulated by the user to define a relative emphasis for a claimset of a particular reference in the relevant references; and
   a figures slider bar configured to be manipulated by the user to define a relative emphasis for figures of a particular reference in the relevant references.

4. The computerized reference analysis system of claim 3, wherein the ranked harvest summary display comprises a three-dimensional surface graph, wherein the axes of the three-dimensional surface graph are the specification, the claimset, and the figures.

5. The computerized reference analysis system of claim 1, wherein the ranked harvest summary display comprises a surface graph.

6. The computerized reference analysis system of claim 1, wherein the ranked harvest summary display comprises an interactive list.

7. The computerized reference analysis system of claim 1, wherein the graphical user interface is further configured to present a filter field configured to receive a filter input from the user, the filter input configured to be read by the ranking engine to dynamically include or exclude particular references from the relevant references based on the filter input.

8. The computerized reference analysis system of claim 1, wherein the filter input is first to invent, first inventor to file, and first to file.

* * * * *